United States Patent [19]
Nakayama et al.

[11] Patent Number: 6,108,497
[45] Date of Patent: *Aug. 22, 2000

[54] STANDARD MEASUREMENT SCALE AND MARKERS FOR DEFINING STANDARD MEASUREMENT SCALE

[75] Inventors: Toshihiro Nakayama; Atsushi Kida; Atsumi Kaneko, all of Tokyo, Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/964,896

[22] Filed: Nov. 5, 1997

[30] Foreign Application Priority Data

| Nov. 6, 1996 | [JP] | Japan | 8-310029 |
| Nov. 6, 1996 | [JP] | Japan | 8-310030 |
| Sep. 24, 1997 | [JP] | Japan | 9-276546 |

[51] Int. Cl.$^7$ .................................................. G03B 29/00
[52] U.S. Cl. ........................... 396/429; 356/21; 348/140
[58] Field of Search ............................. 33/474, 476, 481, 33/482; 116/319, 329, 332; 348/135, 137, 140; 356/20, 21, 22; 396/14, 429, 661; 40/542, 546, 596, 615; 250/483.1; 252/646

[56] References Cited

U.S. PATENT DOCUMENTS

| 364,508 | 7/1887 | Griffiths | 33/482 |
| 614,144 | 11/1898 | Thompson | 33/474 |
| 5,148,591 | 9/1992 | Pryor | 29/407 |
| 5,536,558 | 7/1996 | Shelton | 428/167 |
| 5,603,318 | 2/1997 | Heilbrun et al. | 128/630 |
| 5,642,293 | 6/1997 | Manthey et al. | 364/508 |
| 5,699,444 | 12/1997 | Palm | 382/106 |
| 5,732,474 | 3/1998 | Cannon | 33/452 |
| 5,767,960 | 6/1998 | Orman | 356/139.03 |

*Primary Examiner*—David M. Gray
*Attorney, Agent, or Firm*—Greenblum & Bernstein, P.L.C.

[57] ABSTRACT

A standard scale used in a photogrammetric measurement system has a polygonal plate having three apexes which are arranged to define a reference plane, where each of the apexes defines a reference point. Another standard scale has a light-guide plate member which has three light-emitting spots for defining reference points. Yet another standard scale has a frame member, and reference-point-forming elements, for defining reference points, arranged on the frame to define a reference plane. A marker used in a photogrammetric measurement system for defining a standard scale has a light-guide plate having a light emitting spot for defining a reference point. Another marker has a polygonal-pyramidal-shaped optical assembly formed from light-guide plates, including a core layer containing fluorescent substances, such that an apex of the optical assembly is defined by an emission of fluorescent radiation therefrom.

6 Claims, 23 Drawing Sheets

STANDARD MEASUREMENT SCALE AND MARKERS FOR DEFINING STANDARD MEASUREMENT SCALE

BACKGROUND OF THE INVENTION

1. Field of the Invention

This invention relates to a standard measurement scale and markers for defining a standard measurement scale, which are used in photogrammetric analytical measurement systems.

2. Description of the Related Art

For example, photogrammetry measurement is carried out at a traffic accident site. Namely, the traffic accident site is photographed by a camera or cameras, and a survey map is established on the basis of pictures photographed by the camera. Before real distances and lengths can be reproduced on the survey map, a standard measurement scale must be recorded in the pictures.

Conventionally, the standard measurement scale is defined by at least two cone-shaped markers which are formed of, for example, a suitable plastic material. In particular, for example, at a traffic accident site, two markings are indicated on the ground with chalk, and a distance between the markings is obtained using a measuring tape. Then, the cone-shaped markers are positioned at the respective indications. Thereafter, the traffic accident site is photographed by the camera(s), such that the cone-shaped markers are included in the field of view to be photographed.

Before a survey map can be exactly drawn, the cone-shaped markers must be positioned with respect to the indications on the ground, such that an apex of each cone-shaped marker is just above the corresponding indication, because each of the apexes of the cone-shaped markers serves as a reference point for defining a standard measurement scale.

Nevertheless, it is difficult and troublesome to align the apex of the marker with the indication, because the indication is lost from sight due to the enlarged bottom of the cone-shaped marker during positioning. Further, when the ground is not horizontal, i.e., when the ground is sloped, the positioning of the cone-shaped marker is further complicate, because a fine positional adjustment of the cone-shaped marker is necessary before the apex of the cone-shaped marker can exactly coincide with the corresponding indication.

Also, conventionally, the apex of the cone-shaped marker is painted with a light-color, such as white, yellow or the like, so that the apex is conspicuous when recorded in a photographed picture. Nevertheless, the apex of the marker is ot necessarily conspicuously recorded in the picture, e.g., when the tone of color of the background is similar to the apex color.

Furthermore, it is troublesome to obtain a distance between the indications using the measuring tape. Especially, in photogrammetry, in which a reference plane must be defined by at least three reference points, it is necessary to measure the three distances between the three reference points by using the measuring tape.

SUMMARY OF THE INVENTION

Therefore, an object of the present invention is to provide a standard measurement scale, to be used in a photogrammetric measurement system, having at least three fixed reference points.

Another object of the present invention is to provide such a standard measurement scale as mentioned above, which is constituted such that the reference points can be conspicuously recorded in a photographed picture.

Yet another object of the present invention is to provide a marker for defining a standard measurement scale in a photogrammetric measurement system, which is constituted such that a reference point of the marker can be easily aligned with an indication on the ground.

Still yet another object of the present invention is to provide such a measurement-standard-scale-defining marker as mentioned above, which is constituted such that the reference point can be conspicuously recorded in a photographed picture.

In accordance with a first aspect of the present invention, there is provided a standard measurement scale, to be used in a photogrammetric measurement system, comprising a polygonal plate member having at least three apexes, which are arranged so as to define a reference plane, and each of which defines a reference point. Preferably, the three reference points are equally spaced apart from each other by a predetermined distance. Each of the triangular apexes, of the polygonal member, includes a reference point and may be marked with a conspicuous material. The conspicuous material may comprise a light color paint. Preferably, the light color paint is a fluorescent paint. The conspicuous material may comprise a piece of reflective sheet.

In accordance with a second aspect of the present invention, there is provided a standard measurement scale, to be used in a photogrammetric measurement system, comprising a light-guide plate member including a core layer containing fluorescent substances, said light-guide plate member having at least three light-emitting spots for defining respective reference points. Preferably, the three reference points are equally spaced apart from each other by a predetermined distance. Each of the light-emitting spots may be defined as a cone-shaped or polygonal-pyramidal-shaped recess formed in the light-guide plate member for emitting fluorescent radiation therefrom. Also, each of the light-emitting spots may be defined as a hemispherical projection attached to the light-guide plate member for emitting fluorescent radiation therefrom, or may be defined by at least two V-shaped grooves formed in the light-guide plate member and extending radially from the center thereof for emitting fluorescent radiation therefrom.

In accordance with a third aspect of the present invention, there is provided a standard measurement scale, to be used in a photogrammetric measurement system, comprising: a frame member, and at least three reference-point-forming elements, for defining respective reference points, arranged on the frame member so as to define a reference plane. The standard scale may further comprises a plate member mounted on the frame member. In this case, the three reference-point-forming elements are arranged on the plate member so as to define a reference plane. Preferably, the three reference points are equally spaced apart from each other by a predetermined distance.

Each of the reference-point-forming elements may be formed as a projection for defining the reference point thereof. In this case, the projection may be a light-emitting projection including an electrical lump or a light-emitting diode, and may be formed from at least two light-guide plate elements, including each a core layer containing fluorescent substances, which are arranged such that the reference point of the projection is defined by an emission of fluorescent radiation therefrom.

Also, each of the reference-point-forming elements may be formed as a cone-shaped projection or polygonalpyramidal-shaped projection, an apex of which defines one of the reference points. In this case, the cone-shaped projection or polygonal-pyramidal-shaped projection may be coated with a fluorescent paint, or may be covered with a reflective sheet.

Further, each of the reference-point-forming elements may be formed as a polygonal-pyramidal-shaped projection constructed from at least two light-guide plate elements, including each a core layer containing fluorescent substances. Preferably, the light-guide plate elements are arranged such that the apex of the polygonal-pyramidal-shaped projection is defined by an emission of fluorescent radiation therefrom.

Furthermore, each of the reference-point-forming elements may be formed as a small circular-shaped element for defining the reference point thereof. Preferably, the small circular-shaped element is formed from a reflective sheet.

Yet further, each of the reference-point-forming elements may be formed as a circular-shaped plate element, a center of which defines one of the reference points. In this case, the circular-shaped plate element may be formed as a light-guide plate element including a core layer containing fluorescent substances. Preferably, the light-guide plate element may have: a cone-shaped recess formed at the center thereof for emitting light-rays therefrom; a polygonal-pyramidal-shaped recess formed at the center thereof for emitting fluorescent radiation therefrom; a hemispherical projection attached to the center thereof for emitting fluorescent radiation therefrom; or at least two V-shaped grooves formed therein, which extend radially from the center thereof, for emitting fluorescent radiation therefrom.

In accordance with a fourth aspect of the present invention, there is provided a standard measurement scale, to be used in a photogrammetric measurement system, comprising: a frame member, and a light-guide plate member mounted on the frame member and including a core layer containing fluorescent substances, the light-guide plate member having at least three light-emitting spots for defining respective reference points. Preferably, the three reference points are equally spaced apart from each other by a predetermined distance.

Each of the light-emitting spots may be defined as a cone-shaped recess or a polygonal-pyramidal-shaped recess formed in the light-guide plate member for omitting fluorescent radiation therefrom. Also, the light-emitting spot may be defined as a hemispherical projection attached to the light-guide plate member for emitting fluorescent radiation therefrom, or may be defined by at least two V-shaped grooves formed in the light-guide member and extending radially from the center thereof for emitting fluorescent radiation therefrom.

In accordance with a fifth aspect of the present invention, there is provided a marker, to be used in a photogrammetric measurement system for defining a standard measurement scale, comprising a light-guide plate member including a core layer containing fluorescent substances and having a light emitting spot for defining a reference point.

In accordance with a sixth aspect of the present invention, there is provided a marker, to be used in a photogrammetric measurement system for defining a standard measurement scale, comprising a polygonal-pyramidal-shaped optical assembly, formed from at least two light-guide plate elements, including each a core layer containing fluorescent substances, such that an apex of the polygonal-pyramidal-shaped optical assembly is defined by an emission of fluorescent radiation therefrom.

The polygonal-pyramidal-shaped optical assembly may be produced as a generally-triangular-pyramidal-shaped optical assembly, from three isosceles-triangular light-guide plate elements, in such a manner that an inner triangular-pyramidal space is defined therewithin. Preferably, two contiguous slanting side faces of two adjacent isosceles-triangular light-guide plate elements form a V-shaped trough extending along a corresponding ridgeline of the inner triangular-pyramidal space, and the predominant emission of fluorescent radiation occurs from the side faces.

Also, the polygonal-pyramidal-shaped optical assembly may be produced as a generally-quadrilateral-pyramidal-shaped optical assembly, by crosswisely interlinking two isosceles-triangular light-guide plate elements. Preferably, the predominant emission of fluorescent occurs the slanting side faces of each isosceles-triangular light-guide plate element.

Preferably, each of the isosceles-triangular light-guide plate elements has a slit formed therein, whereby the light-guide plate elements are detachably and crosswisely interlinked via the slits formed therein. In this case, the isosceles-triangular light-guide plate elements preferably have the same isosceles-triangular shape.

BRIEF DESCRIPTION OF THE DRAWINGS

The objects and other objects of the present invention will be better understood from the following description, with reference to the accompanying drawings in which.

DESCRIPTION OF THE PREFERRED EMBODIMENTS

Figure 1:
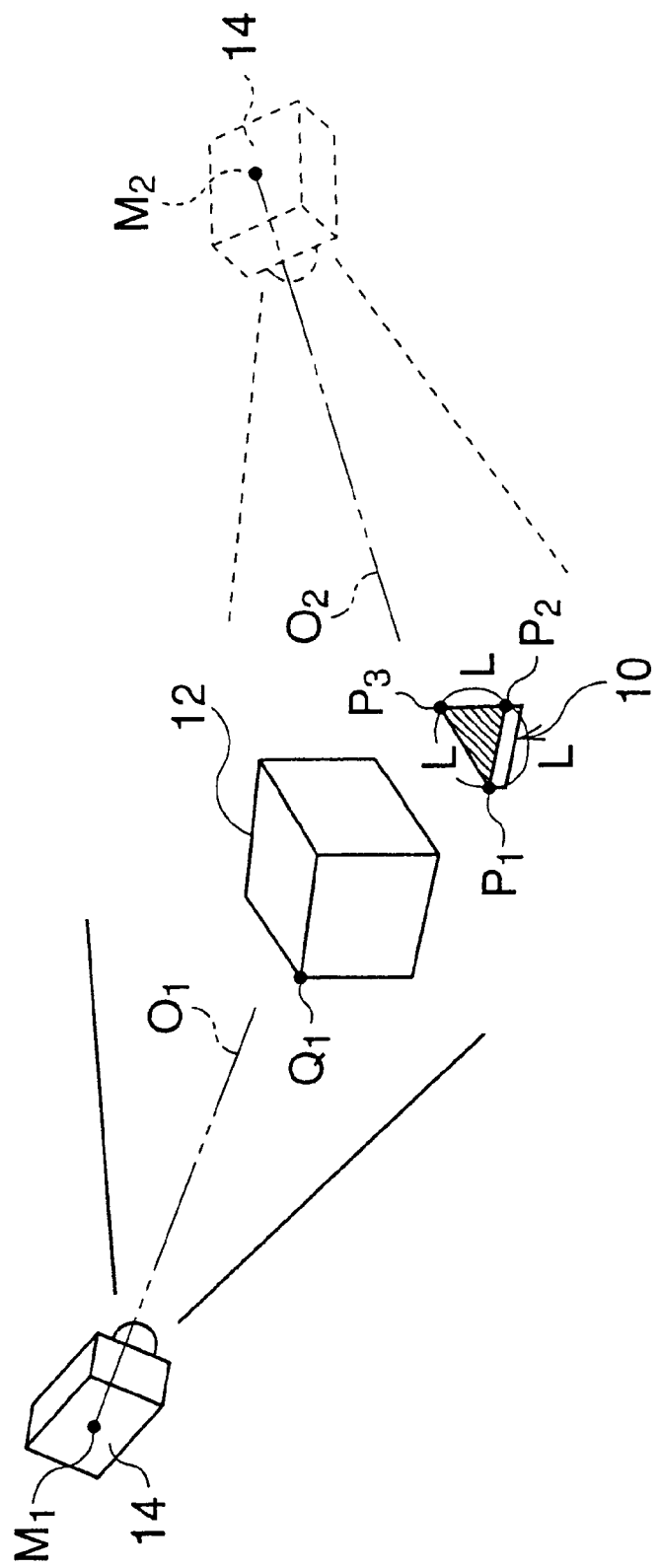
FIG. 1 is a conceptual perspective view showing a photogrammetric measurement system using a standard measurement scale, according to the present invention.

FIG. 1 conceptually shows a photogrammetric measurement System, using a standard measurement scale 10, constructed according to the present invention. The standard measurement scale 10 is placed beside a cubic object 12 to be measured, and the standard scale 10 and the cubic object (three dimensional) 12 are photographed in two different directions by an electronic still video camera 14. Namely, as shown in FIG. 1, the standard scale 10 and the cubic object 12 are photographed by the camera 14 placed at a first photographing position $M_1$, shown by a solid line, and are then photographed by the camera 14 placed at a second photographing position $M_2$, shown by a dashed line. At the first photographing position $M_1$, an optical axis of the camera 14 is indicated by reference $O_1$, and, at the second photographing position $M_2$, the optical axis of the camera 14 is indicated by reference $O_2$.

Note, each of the first and second photographing positions $M_1$ and $M_2$ may be defined as a back principal point of the photographing lens system of the camera 14.

The standard measurement scale 10 is shaped as an equilateral-triangular plate member, and has three reference points $P_1$, $P_2$ and $P_3$ positioned in the vicinity of the apexes of the equilateral-triangular plate member, such that an equilateral triangle is defined by the reference points $P_1$, $P_2$ and $P_3$, as shown by a hatched area in FIG. 1. The sides of the equilateral triangle, defined by the reference points $P_1$, $P_2$ and $P_3$, have a length of L.

Figure 2:
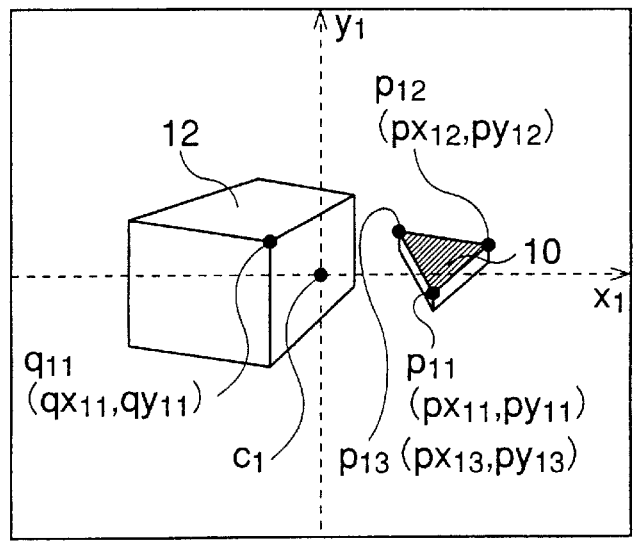
FIG. 2 is a conceptual view showing a picture photographed at a first photographing position in the measurement system of FIG. 1.

FIG. 2 shows a first picture photographed by the camera 14 at the first photographing position $M_1$. As is apparent from this drawing, a rectangular $x_1$-$y_1$ coordinate system is defined on the first picture, and an origin $c_1$ of the $x_1$-$y_1$ coordinate system is at the photographing center of the first picture. In this coordinate system, the reference points $P_1$, $P_2$ and $P_3$ are represented by coordinates $p_{11}(px_{11}, py_{11})$, $p_{12}(px_{12}, py_{12})$ and $p_{13}(px_{13}, Py_{13})$, respectively.

Figure 3:
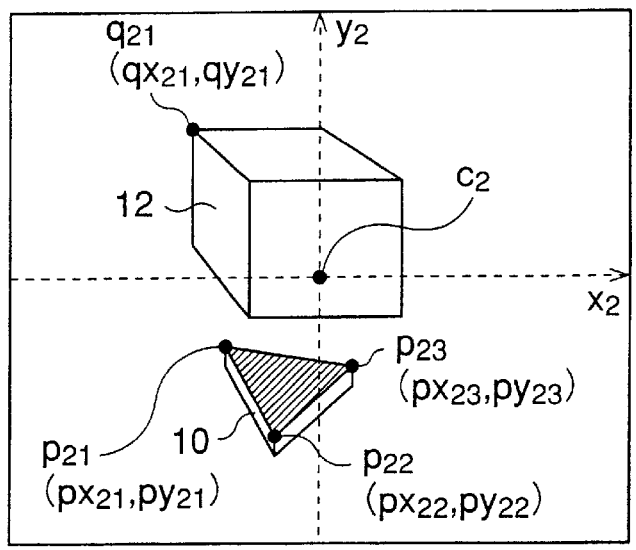
FIG. 3 is a conceptual view showing another picture photographed at a second photographing position in the measurement system of FIG. 1.

FIG. 3 shows a second picture photographed by the camera 14 at the second photographing position $M_2$. As is apparent from this drawing, a rectangular $x_2$-$y_2$ coordinate system is defined on the second picture, and an origin $c_2$ of the $x_2$-$y_2$ coordinate system is at the photographing center of the second picture. In this coordinate system, the reference points $P_1$, $P_2$ and $P_3$ are represented by coordinates $p_{21}(px_{21}, py_{21})$, $p_{22}(px_{22}, py_{22})$ and $p_{23}(px_{23}, py_{23})$, respectively.

Figure 4:
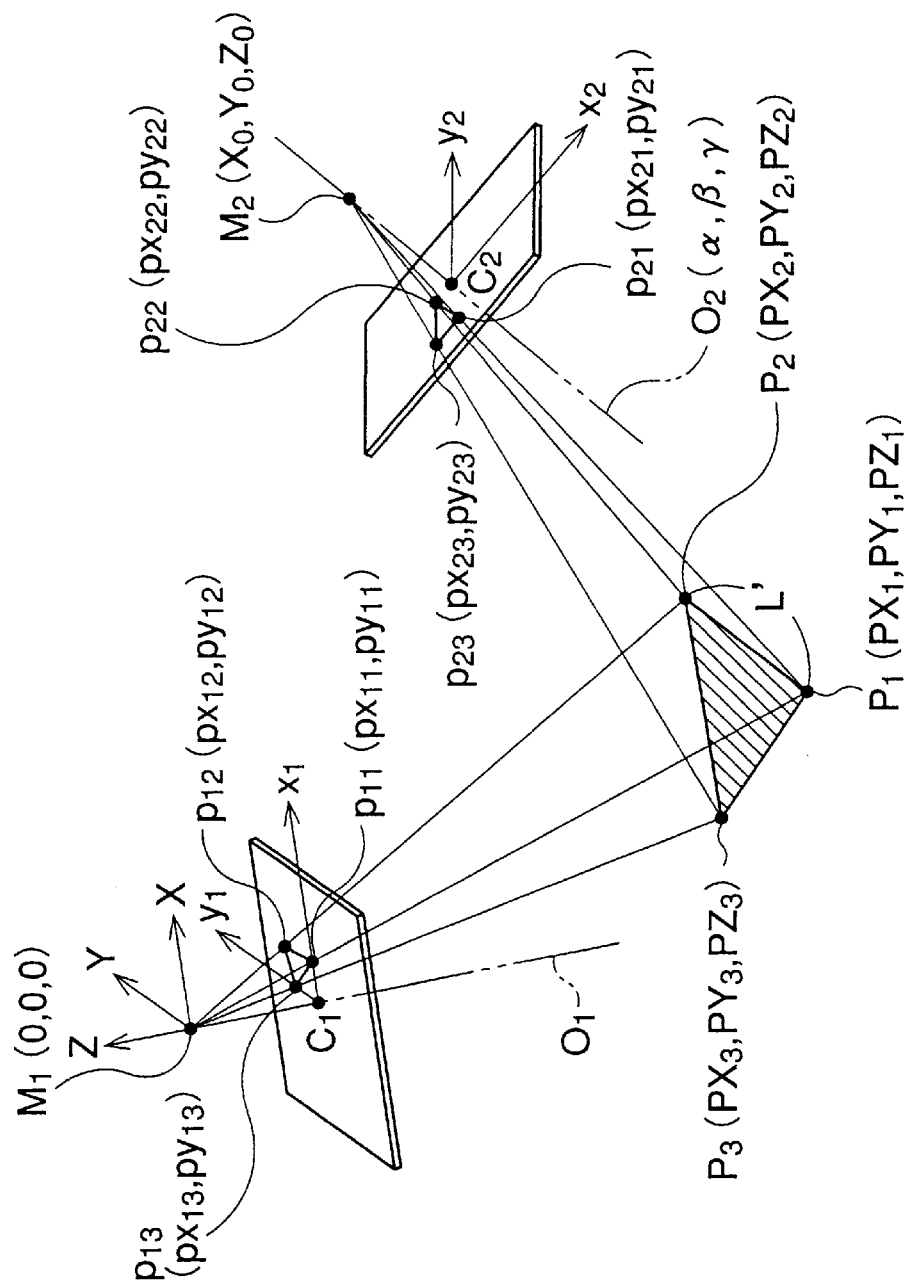
FIG. 4 is a conceptual view showing a relative-positional relationship between the standard scale and the first and second pictures from FIGS. 2 and 3 respectively.

FIG. 4 shows a relative-positional three-dimensional relationship between the standard scale 10, the camera 14, and the first and second pictures. In this case, the standard scale 10 is relatively reproduced on the basis of the first and second pictures placed at the first and second photographing positions $M_1$ and $M_2$, but a size of the standard scale 10 is relative. Thus, a length of the sides of the equilateral triangle, defined by the reference points $P_1$, $P_2$ and $P_3$, is indicated by L'.

In order to calculate three-dimensional coordinates of the cubic object 12, it is necessary to define an X-Y-Z three-dimensional coordinate system, as shown in FIG. 4, and the reference points $P_1$, $P_2$ and $P_3$ of the standard scale 10, recorded on each of the first and second pictures, must be positionally determined with respect to the three-dimensional coordinate system.

As shown in FIG. 4, an origin of the three-dimensional coordinate system is at the first photographing position $M_1$. Namely, the first photographing position $M_1$ is represented by the origin coordinates (0, 0, 0) of the three-dimensional coordinate system. Also, a Z-axis of the three-dimensional coordinate system coincides with the optical axis $O_1$ of the camera 14 placed at the first photographing position $M_1$. The second photographing position $M_2$ is represented by coordinates $(X_0, Y_0, Z_0)$, and the optical axis $O_2$ of the camera 14, placed at the second photographing position $M_2$, is represented by angular coordinates $(\alpha, \beta, \gamma)$. Namely, the optical axis $O_2$ of the camera 14 defines angles of $\alpha$, $\beta$ and $\gamma$ with the X-axis, Y-axis and Z-axis of the three-dimensional coordinate system, respectively.

The reference points $P_1$, $P_2$ and $P_3$ of the standard scale 10 are represented by three-dimensional coordinates $P_j(PX_j, PY_j, PZ_j)$ (j=1, 2, 3). As shown in FIG. 4, each of the reference points $[P_1(PX_1, PY_1, PZ_1), P_2(PX_2, PY_2, PZ_2)$ and $P_3(PX_3, PY_3, PZ_3)]$, the image point $[p_{11}(px_{11}, py_{11}), p_{12}(px_{12}, py_{12}), p_{13}(px_{13}, py_{13})]$ of the corresponding reference point recorded on the first picture, and the back principal point $(M_1)$ of the camera 14 are aligned with each other on a straight axis. Similarly, each of the reference points $[P_1(PX_1, PY_1, PZ_1), P_2(PX_2, PY_2, PZ_2)$ and $P_3(PX_3, PY_3, PZ_3)]$, the image point $[p_{21}(px_{21}, py_{21}), p_{22}(px_{22}, py_{22}), p_{23}(px_{23}, py_{23})]$ of the corresponding reference point recorded on the second picture, and the back principal point $(M_2)$ of the camera 14 are aligned with each other on a straight axis.

Accordingly, the three-dimensional coordinates $P_j(PX_j, PY_j/PZ_j)$ can be determined by the following collinear equations:

$$PX_j = (PZ_j - Z_o)\frac{a_{11}px_{ij} + a_{21}py_{ij} - a_{31}C}{a_{13}px_{ij} + a_{23}py_{ij} - a_{33}C} + X_0$$

$$PY_j = (PZ_j - Z_o)\frac{a_{12}px_{ij} + a_{22}py_{ij} - a_{32}C}{a_{13}px_{ij} + a_{23}py_{ij} - a_{33}C} + Y_0$$

$(i = 1, 2; j = 1, 2, 3)$

Herein:

$a_{11}$=cos $\beta$*sin $\gamma$ $a_{12}$=−cos $\beta$*sin $\gamma$ $a_{13}$=sin $\beta$ $a_{21}$=cos $\alpha$*sin $\gamma$+sin $\alpha$*sin $\beta$*cos $\gamma$ $a_{22}$=cos $\alpha$*cos $\gamma$+sin $\alpha$*sin $\beta$*sin $\gamma$ $a_{23}$=−sin $\alpha$*sin $\beta$ $a_{31}$=sin $\alpha$*sin $\gamma$+cos $\alpha$*sin $\beta$*cos $\gamma$ $a_{32}$=sin +*cos $\gamma$+cos $\alpha$*sin $\beta$*sin $\gamma$ $a_{33}$−cos $\alpha$*cos $\beta$ Note that, in these equations, "C" indicates a principal focal length of the camera 14, which is defined as a distance between the back principal point $(M_1)$ and the photographing center $(c_1)$ of the first picture, and a distance between the back principal point $(M_2)$ and the photographing center $(c_2)$ of the second picture. Also note, "i" corresponds to a number of the pictures; and "j" corresponds to a number of the reference points $P_1$, $P_2$ and $P_3$ of the standard scale 10.

Figure 5:
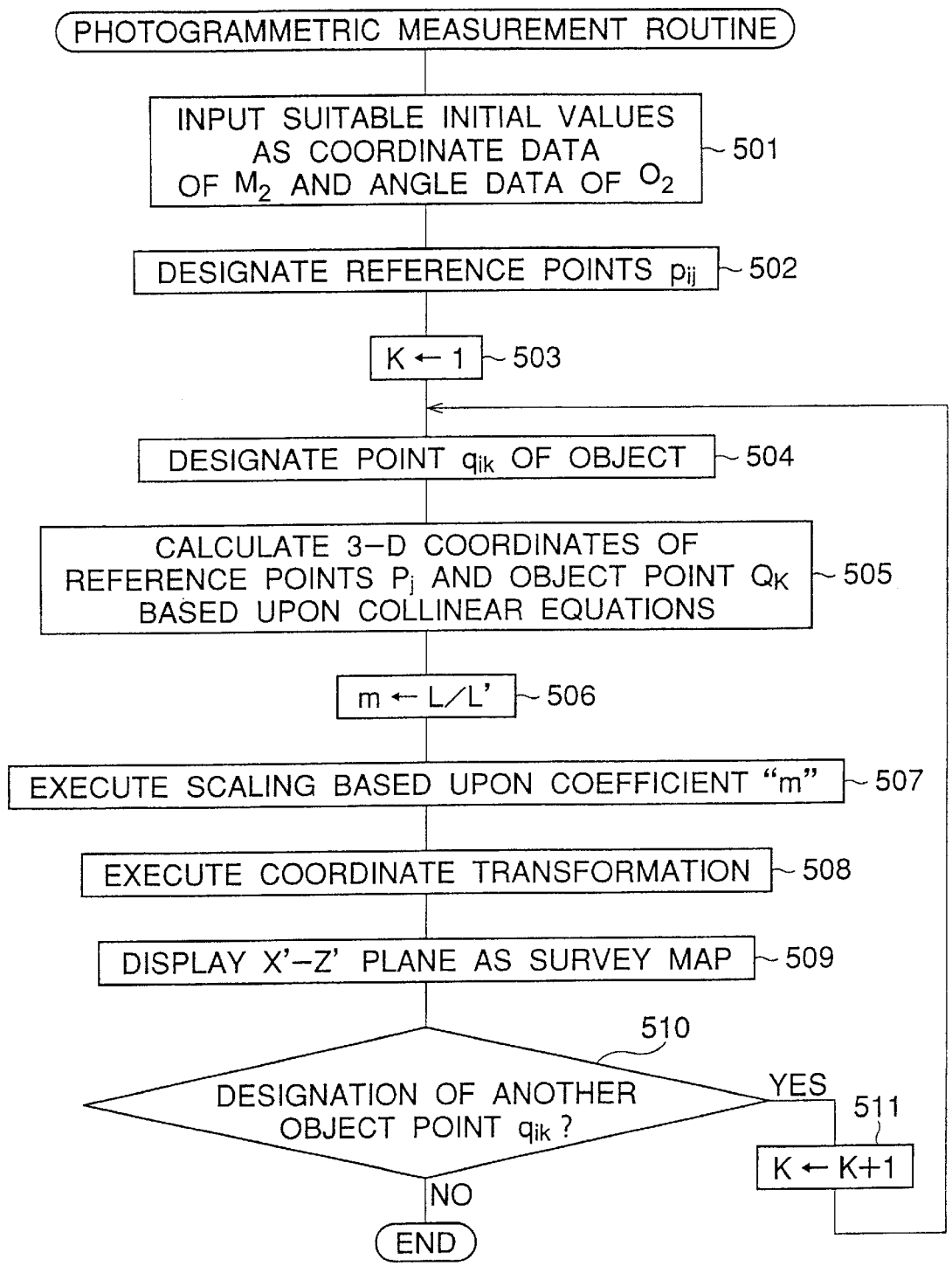
FIG. 5 is a flowchart showing a photogrammetric measurement routine for producing a survey map on the basis of the first and second pictures from FIGS. 2 and 3 respectively.

FIG. 5 shows a flowchart for a photogrammetric 0measurement routine, in which a survey map is made on the basis of the first and second pictures, shown in FIGS. 2 and 3. This routine is executed by a computer (not shown). Before the execution of the routine, the video data of the first and second pictures is fed from the electronic still video camera 14 to the computer, and the first and second pictures are simultaneously displayed on a TV monitor connected to the computer, as shown in FIGS. 2 and 3.

At step 501, as coordinate data $(X_0, Y_0, Z_0)$ of the second photographing position $M_2$ and as angular coordinate data $(\alpha, \beta, \gamma)$ of the optical axis $O_2$, suitable initial values (except for zero) are inputted to the computer through, for example, a keyboard. Then, at step 502, the respective reference points $P_{ij}(px_{ij}, py_{ij})$ are successively designated, on the first and second pictures displayed on the TV monitor, with a cursor manipulated by a mouse. Namely, the two sets of coordinates $P_{11}(px_{11}, py_{11})$ and $P_{21}(px_{21}, py_{21})$, the two sets of coordinates $P_{12}(px_{12}, py_{12})$ and $P_{22}(px_{22}, py_{22})$, and the two sets of coordinates $P_{13}(px_{13}, py_{13})$ and $P_{23}(px_{23}, py_{23})$ are retrieved by a central processing unit (CPU)or of the computer.

After the designation of the reference points $P_{ij}(px_{ij}, py_{ij})$ and $P_{ij}(px_{ij}, py_{ij})$, at step 503, a counter k is made to be "1". Then, at setp 504, a suitable point $Q_{1(k=1)}$ of the cubic object 12 is selected, and image points $q_{ik}$ (FIGS. 2 and 3) of the point $Q_1$, displayed on the first and second pictures of the TV monitor, are designated with the cursor manipulated by the mouse. Namely, the two sets of coordinates $q_{11}(qx_{11}, q_{11})$ and $q_{21}(q_{21}, qy_{21})$ of the image point $Q_1$ is retrieved by the central processor of the computer.

At stop 505, the above-mentioned collinear equations are solved on the basis of the retrieved coordinates, and three-dimensional coordinates $P_j(PX_j, PY_j, PZ_j)$ of the reference points $P_1$, $P_2$ and $P_3$, and three-dimensional coordinates $Q_1(QX_1, QY_1, QZ_1)$ of the object point $Q_1$ are determined. Then, primary-approximate data of the three-dimensional coordinates $(X_0, Y_0, Z_0)$ of the second photographing position $M_2$ and the angle coordinates $(\alpha, \beta, \gamma)$ of the optical axis $O_2$ are determined, i.e. the initial coordinate data $(X_0, Y_0, Z_0)$ and the initial angular coordinate data $(\alpha, \beta, \gamma)$, inputted at stop 501, are revised by the primary-approximate data.

At step 506, a coefficient "m" is calculated as follows:

m=L/L'

Note, "L" is the real length between the reference points $P_1$, $P_2$, and $P_3$ and "L" is the relative length obtained from the determined three-dimensional coordinates $P_j(PX_j, PY_j, PZ_j)$.

At step 507, scaling is executed, using the coefficient "m", between the determined three-dimensional coordinates $P_j(PX_j, PY_j, PZ_j)$ and $Q_1$ $(QX_1, QY_1, QZ_1)$, so as to obtain a real spatial relationship therebetween. Then, at step 50B, the X-Y-Z three-dimensional coordinate system is transformed into an X'-Y'-Z' three-dimensional coordinate system defined as shown in FIG. 6.

Figure 6:
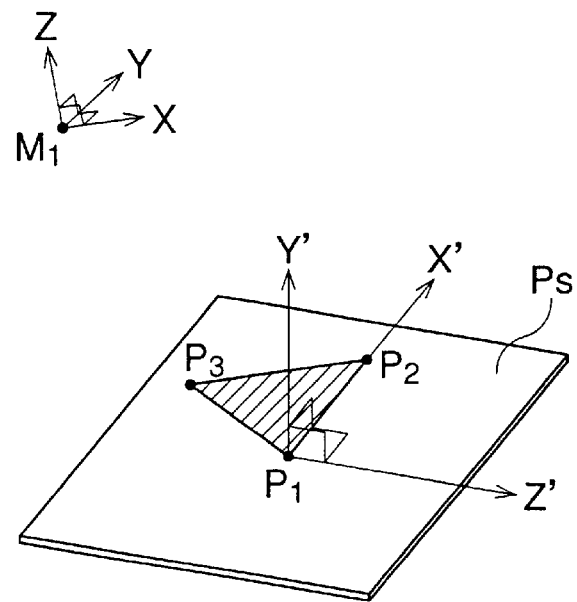
FIG. 6 is a conceptual view showing a three-dimensional coordinate system for producing the survey map.

As is apparent from FIG. 6, an origin of the X'-Y'-Z' three-dimensional coordinate system is at the reference point $P_1$, and the X'-axis thereof is defined by the reference points $P_1$ and $P_2$. Also, The X'- and Z'-axes of the coordinate system define a plane "Ps" which includes a hatched triangular plane area defined by the reference points $P_1$, $P_2$ and $P_3$. Note, in the example of FIG. 6, although the origin of the X'-Y'-Z' three-dimensional coordinate system coincides with the reference point $P_1$, the origin may be at any location included in the plane "Ps".

At stop 509, for example, the X'-Z' plane or plane on which the reference points $P_1$, $P_2$ and $P_3$ and the object point $Q_1$ are recorded, is displayed as a survey map on another TV monitor. Nevertheless, the displayed survey map is not accurate, because the revised coordinate data ($X_0$, $Y_0$, $Z_0$) and angular coordinate data ($\alpha$, $\beta$, $\gamma$) are not sufficiently approximated.

At step 510, it is determined whether or not another set of points $q_{1k}$ and $q_{2k}$ should be designated with respect to the cubic object 12. When the other set of points $q_{1k}$ and $q_{2k}$ should be further designated, i.e. when the renewed coordinate data ($X_0$, $Y_0$, $Z_0$) and angular coordinate data ($\alpha$, $\beta$, $\gamma$) are not sufficiently approximated, at step 511, the counter k is incremented by "1". Thereafter, the routine comprising steps 504 to 510 is again executed.

At step 510, when a further set of points $q_{1k}$ and $q_{2k}$ should not be designated, i.e. when the renewed coordinate data ($X_0$, $Y_0$, $Z_0$) and angular coordinate data ($\alpha$, $\beta$, $\gamma$) are sufficiently approximated, this routine is completed.

Before the approximation of the coordinate data ($X_0$, $Y_0$, $Z_0$) and angular coordinate data ($\alpha$, $\beta$, $\gamma$) is acceptable, it is necessary to designate at least two sets of points $q_{1k}$ and $q_{2k}$ with respect to the cubic object 12, i.e. the approximation calculation should be repeated at least twice. Preferably, more than two sets of object points $q_{1k}$ and $q_{2k}$ should be designated, i.e., the approximation calculation should be repeated more than twice.

Figure 7:
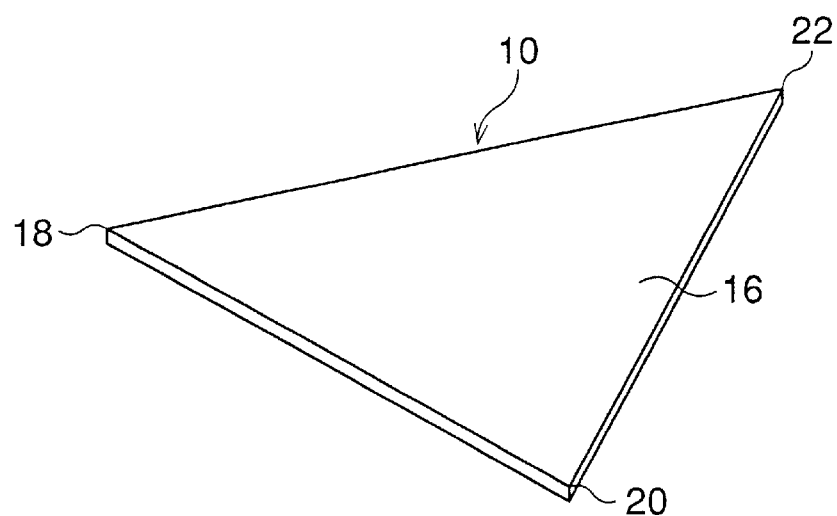
FIG. 7 is a perspective view of a first embodiment of the standard scale, according to the present invention.

FIG. 7 shows a first embodiment of the standard measurement scale 10 according to the present invention. In this embodiment, the standard measurement scale 10 comprises an equilateral-triangular plate 16, a thickness of which may be from about 2 mm to about 3 mm. Although it is preferable to form the triangular plate 16 of a suitable resin material, such as acrylic resin, the triangular plate 16 may be formed of another material, such as a wood, a suitable metal and so on. Three respective apexes 18, 20 and 22 of the triangular plate 16 define the points $P_1$, $P_2$ and $P_3$ of the standard scale 10, and a distance between the reference points $P_1$, $P_2$ and $P_3$ may be 1 m.

Preferably, the small triangular area including each of the reference points $P_1$, $P_2$ and $P_3$ is marked with a suitable material, such as a reflective paint, a fluorescent paint, a piece of reflective sheet and so on, because the reference points $P_1$, $P_2$ and $P_3$ are required to be conspicuously recorded on a photographed picture. Thus, the designation of the reference points $P_1$, $P_2$ and $P_3$ with a cursor on a TV monitor, as mentioned above, can be easily carried out.

Figure 8:
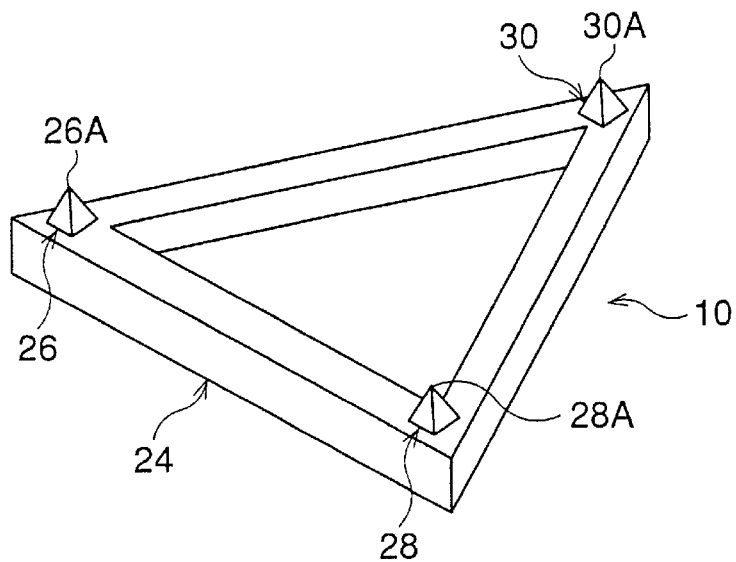
FIG. 8 is a perspective view of a second embodiment of the standard scale, according to the present invention.

FIG. 8 shows a second embodiment of the standard measurement scale 10 according to the present invention. In this second embodiment, the standard measurement scale 10 comprises an equilateral-triangular frame 24, and three respective projections 26, 28 and 30 securely mounted on the apex areas of the frame 24. The triangular frame 24 may be assembled from rectangular wood lumbers having, for example, a width of about 30 mm to about 50 mm and a thickness of about 50 mm. Of course, the frame 24 may be formed of another material such as a suitable resin, a suitable metal and so on. Similarly, the projections 26, 28 and 30 may be shaped from a wood, a suitable resin, a suitable metal and so on.

In this embodiment, although each of the projections 26, 28 and 30 is formed as a quadrangular pyramid, each projection may be shaped into another form such as a circular cone, a triangular-based pyramid, a polygonal-base pyramid, a hemisphere or the like. Three respective apexes 26A, 28A and 30A of the projections 26, 28 and 30 define the reference points $P_1$, $P_2$ and $P_3$ of the standard scale 10, and a distance between the points $P_1$, $P_2$ and $P_3$ may be 1 m. Note, each of the bottom sides of the quadrangular-pyramidal-shaped projection (26, 28, 30) may have a length of about 50 mm.

In order to conspicuously record the reference points $P_1$, $P_2$ and $P_3$, defined by the projections 26A, 28A and 30A, on a photographed picture, each of the projections 26, 28 and 30 may be coated with a reflective paint, a fluorescent paint or the like. Also, the surfaces of each projection 26, 28, 30 may be covered with a piece of reflective sheet and so on.

Figure 9:
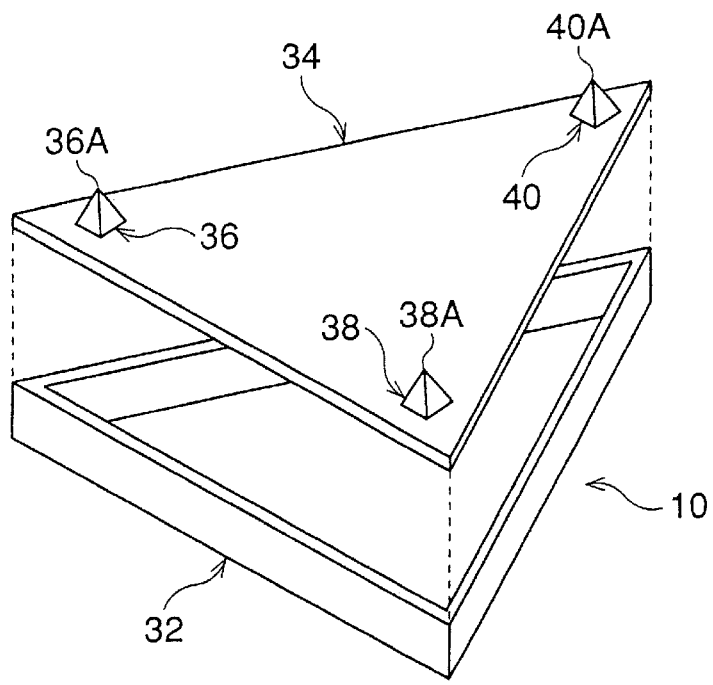
FIG. 9 is a perspective view of a third embodiment of the standard scale, according to the present invention.

FIG. 9 shows a third embodiment of the standard measurement scale 10 according to the present invention. In this third embodiment, the standard measurement scale 10 comprises an equilateral-triangular frame 32, an equilateral triangular-plate 34 securely attached to the frame 32, and three respective projections 36, 38 and 40 securely mounted on the apex areas of the plate 34. The triangular frame 32 may be assembled from elongated wood boards, and the triangular plate 32 may be shaped from a wood board. Of course, the frame 32 and the plate 34 may be formed of another material such as a suitable resin, a suitable metal and so on. The projections 36, 38 and 40 may be made and shaped in substantially the same manner as the projections 26, 28 and 30 of the second embodiment.

Similar to the second embodiment, three respective apexes 36A, 38A and 40A of the projections 36, 38 and 40 define the reference points $P_1$, $P_2$ and $P_3$ of the standard measurement scale 10, and a distance between the points $P_1$, $P_2$ and $P_3$ may be 1 m. Further, in order to conspicuously record the reference points $P_1$, $P_2$ and $P_3$ on a photographed picture, each of the projections 36, 38 and 40 also may be coated with a reflective paint, a fluorescent paint or the like, or the surfaces of each projection 36, 38, 40 may be covered with a piece of reflective sheet and so on.

Figure 10:
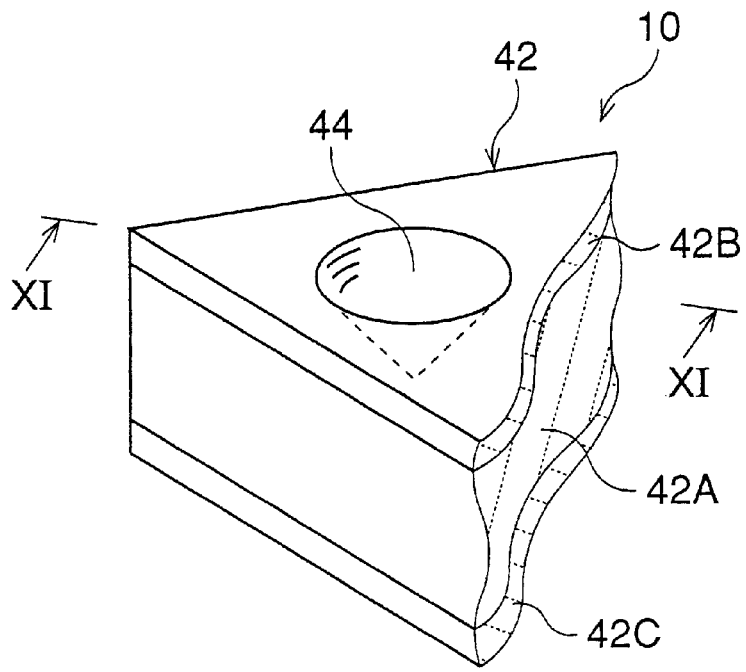
FIG. 10 is a partial perspective view of a fourth embodiment of the standard scale, according to the present invention.
Figure 11:
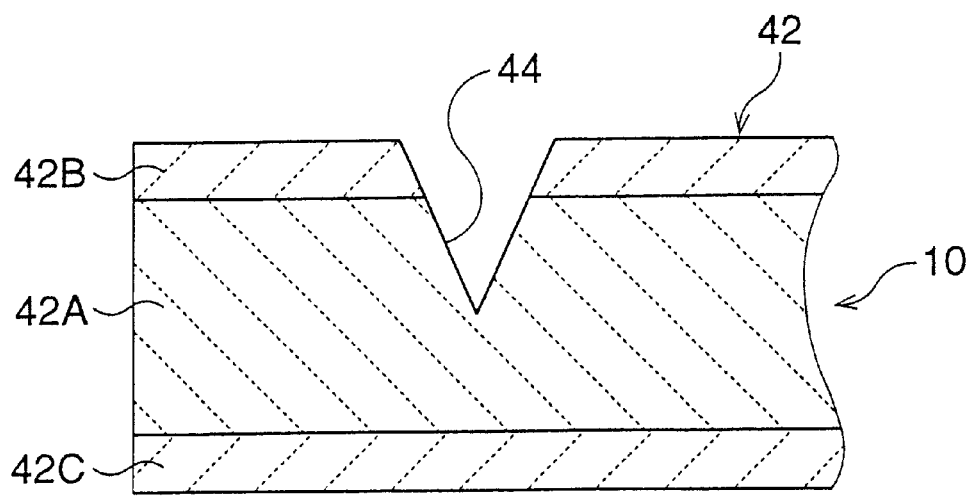
FIG. 11 is a sectional view taken along line XI—XI of FIG. 10.

FIGS. 10 and 11 show a fourth embodiment of the standard measurement scale 10, according to the present invention. In this fourth embodiment, the standard measurement scale 10 comprises an equilateral-triangular light-guide plate 42. Note, in FIG. 10, only an apex area of the triangular light-guide plate 42 is illustrated.

As shown in FIG. 11, the light-guide plate 42 is constituted from a core layer 42A containing fluorescent substances uniformly distributed therein, a first clad layer 42B formed over an upper surface of the core layer 42A, and a second clad layer 42C formed over a lower surface of the core layer 42A. In this embodiment, the core layer 42A is made of an acrylic resin material, and the first and second clad layers 42B and 42C are made of an acrylic resin material exhibiting an index of refraction smaller than that of the acrylic resin material of the core layer 42A.

Although light rays, which become incident upon the clad layers 42B and 42C at a right angle with respect to the surfaces thereof, can pass through the light-guide plate 42, light rays, which become incident upon the clad layers 42B and 42C at a slanting angle with respect to surfaces thereof, are trapped in the light-guide plate 42. Also, light-rays, which become incident upon the core layer 42A via the peripheral side faces of the light-guide plate 42, cannot be substantially emitted from the core layer 42A through the first and second clad layers 42B and 42C.

When the fluorescent substances, contained in the core layers 42A, are subjected to the light rays, the fluorescent substances generate fluorescent radiation as visible light. The generated fluorescent radiation is trapped between the first and second clad layers 42B and 42C, i.e. the fluorescent radiation cannot be emitted from the core layer 42A through the first and second clad layers 42B and 42C. Note, of course, the fluorescent radiation can be emitted from the peripheral side faces of the plate 42.

As representatively shown in FIGS. 10 and 11, three small cone-shaped recesses 44 are respectively formed at the apex areas of the upper surface of the light-guide plate 42, and define the reference points $P_1$, $P_2$ and $P_3$ of the standard scale 10, where a distance between the points $P_1$, $P_2$ and $P_3$ may be 1 m. As best shown in FIG. 11, each of the cone-shaped recesses 44 penetrates the core layer 42A, so that a part of the fluorescent radiation is emitted from each of the cone-shaped recesses 44. Thus, when the standard scale 10 of the fourth embodiment is photographed by the camera 14, the reference points $P_1$, $P_2$ and $P_3$, which are defined by the cone-shaped recesses 44, are conspicuously recorded on a photographed picture.

Note, in the fourth embodiment, it should be understood that polygonal-pyramidal-shaped recesses such as triangular-pyramidal-shaped recesses, quadrangular-pyramidal-shaped recesses, or the like, may be substituted for the cone-shaped recesses 44.

Figure 12:
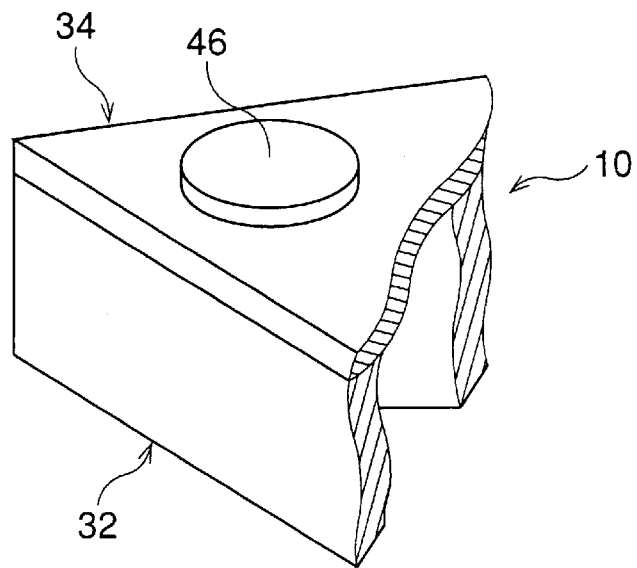
FIG. 12 is a partial perspective view of a fifth embodiment of the standard scale, according to the present invention.

FIG. 12 shows a fifth embodiment of the standard measurement scale 10, according to the present invention. Note, in this drawing, only an apex area of the standard plate 10 is illustrated. The fifth embodiment is substantially similar to the third embodiment (FIG. 9), except that three pieces of reflective sheet 46 are respectively substituted for the projections 36, 38 and 40 for defining the reference points $P_1$, $P_2$ and $P_3$. Of course, the reflective pieces 46, defining the reference points $P_1$, $P_2$ and $P_3$, are conspicuously recorded on a photographed picture due to the reflectivity thereof.

Figure 13:
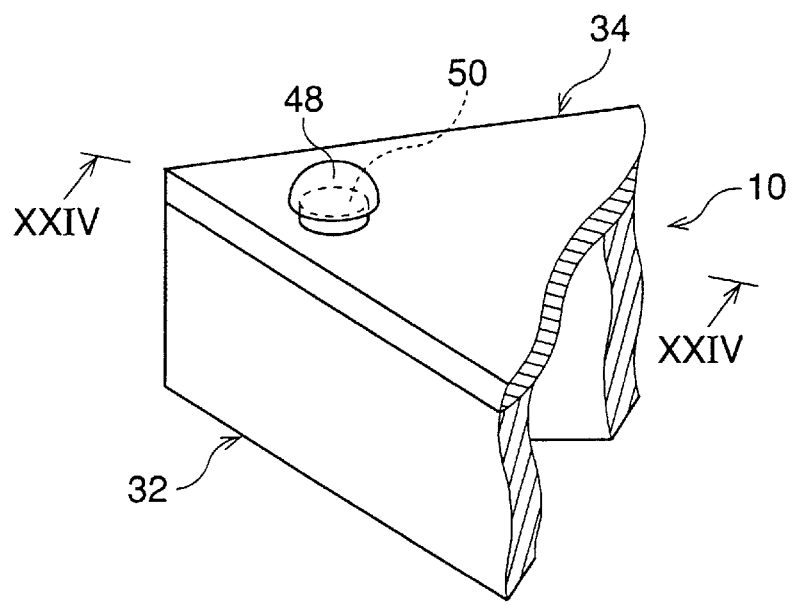
FIG. 13 is a partial perspective view of a sixth embodiment of the standard scale, according to the present invention.
Figure 14:
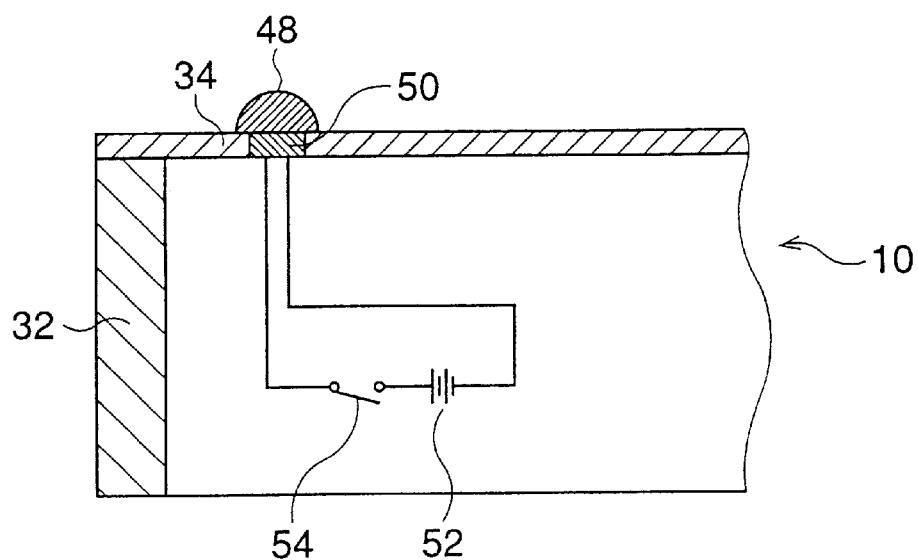
FIG. 14 is sectional view taken along line XIV—XIV of FIG. 13.

FIGS. 13 and 14 show a sixth embodiment of the standard measurement scale 10, according to the present invention. Note, in this drawing, only an apex area of the standard plate 10 is illustrated. This sixth embodiment also is substantially similar to the third embodiment (FIG. 9), except that three hemispherical lenses 48 are respectively substituted for the projections 36, 38 and 40 for defining the reference points $P_1$, $P_2$ and $P_3$ of the standard scale 10.

In the sixth embodiment, each of the hemispherical lenses 48 is associated with an electrical light source 50, such as an electrical lamp, a light emitting diode (LED) or the like. As shown in FIG. 14, the electrical light source 50 is connected to an electric power source 52 through an ON/OFF switch 54. When the switch is turned ON, the light source 50 is electrically energized by the power source 52, resulting in emitting light rays from the light source 50 The light rays are radiated in all directions from the hemispherical lens 48. Accordingly, the hemispherical lenses 48, defining the reference points $P_1$, $P_2$ and $P_3$, are conspicuously recorded on a photographed picture due to the omission of the light rays from the light source 50.

Figure 15:
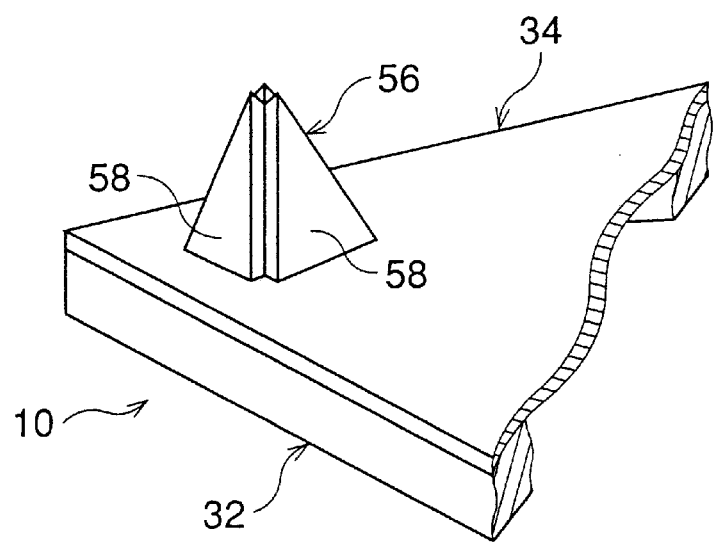
FIG. 15 is a partial perspective view of a seventh embodiment of the standard scale, according to the present invention.
Figure 16:
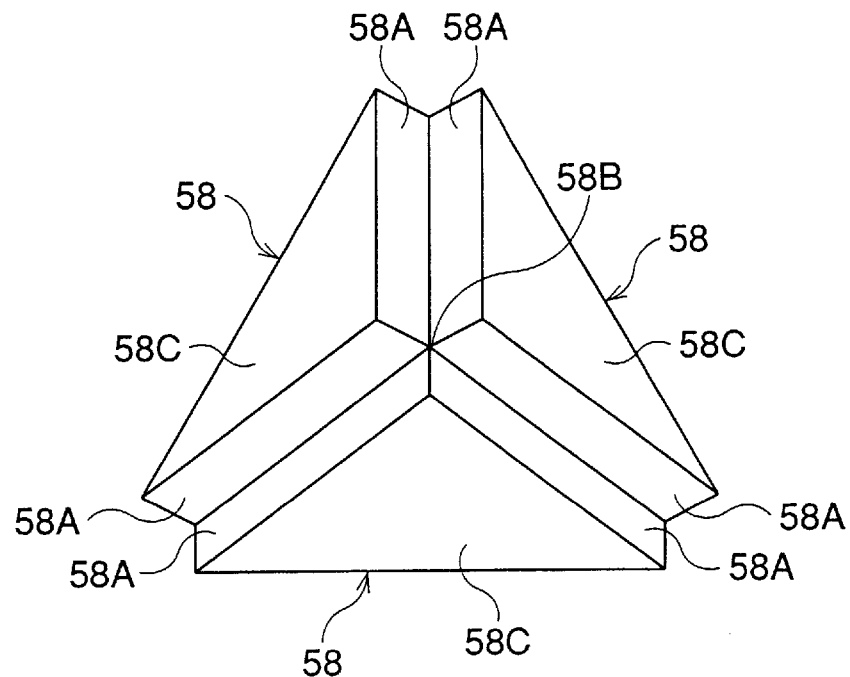
FIG. 16 is a plan view of a generally-triangular-pyramidal-shaped optical projection, shown in FIG. 15.

FIGS. 15 and 16 show a seventh embodiment of the standard measurement scale 10, according to the present invention. Note, in FIG. 15, only an apex area of the standard plate 10 is illustrated. This seventh embodiment also is similar to the third embodiment (FIG. 9), except that three generally-triangular-pyramidal-shaped optical projections 56 are respectively substituted for the protections 36, 38 and 40 for defining the reference points $P_1$, $P_2$ and $P_3$ of the standard scale.

In the seventh embodiment, each of the optical projections 56 comprises three isosceles-triangular light-guide plate elements 58 having, for example, a thickness of about 2 mm, a bottom length of about 50 mm, and a height of about 50 mm. Each of the light-guide plate elements 58 has the same optical structure as the light-guide plate 42 of the fourth embodiment (FIGS. 10 and 11). Namely, the light-guide plate element 58 is constituted from a core layer containing fluorescent substances uniformly distributed therein, a first clad layer formed over an upper surface of the core layer, and a second clad layer formed over a lower surface of the core layer. The core layer is made of an acrylic resin material, and the first and second clad layers are made of an acrylic resin material exhibiting an index of refraction smaller than that of the acrylic resin material of the core layer.

Each of the optical projections 56 is assembled from the three light-guide plate elements 58, in such a manner that an inner triangular-pyramidal space is defined therewithin. As best shown in FIG. 16, two contiguous side faces 58A of two adjacent light-guide plate elements 58 form a V-shaped trough extending along a corresponding ridgeline of the inner triangular-pyramidal space, and an apex 58B of the inner triangular-pyramidal space defines one of the reference points $P_1$, $P_2$ and $P_3$.

The fluorescent radiation, generated and trapped in the core layer of each light-guide plate element 58, cannot be substantially emitted from a triangular surface 58C thereof, but a part of the fluorescent radiation can be emitted from the side faces 58A thereof. Thus, the V-shaped troughs of the optical projection 56 are conspicuously recorded on a photographed picture, whereby the convergent canter 58B of the V-shaped troughs can be easily located from the photographed picture.

Figure 17:
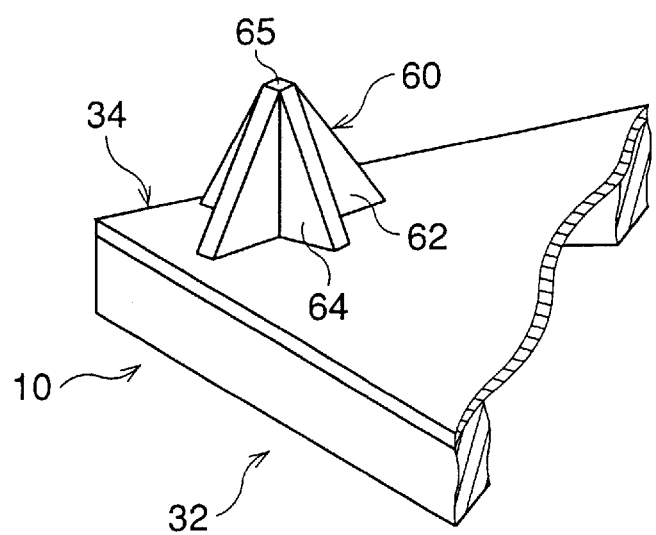
FIG. 17 is a partial perspective view of an eighth embodiment of the standard scale, according to the present invention.
Figure 18:
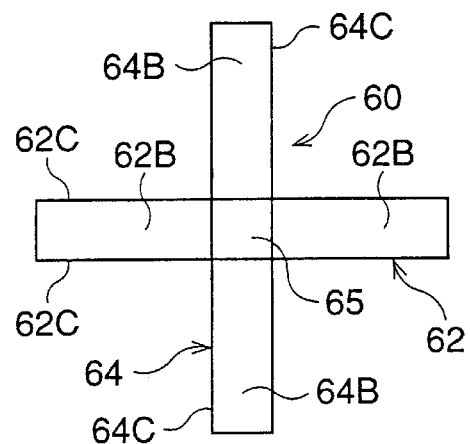
FIG. 18 is a plan view of a generally-quadrilateral-pyramidal-shaped optical projection, shown in FIG. 17.
Figure 19:
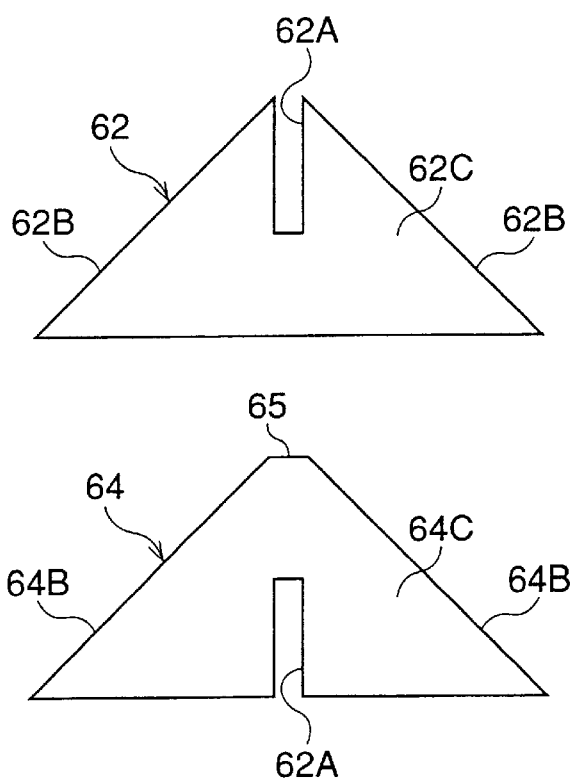
FIG. 19 is an elevational view of two isosceles-triangular light-guide plate elements for assembling the generally-quadrilateral-pyramidal-shaped optical projection, shown in FIG. 17.

FIGS. 17, 18 and 19 show an eighth embodiment of the standard measurement scale 10, according to the present invention. Note, in FIG. 17, only an apex area of the standard plate 10 is illustrated. This eighth embodiment also is substantially similar to the third embodiment (FIG. 9), except that three generally-quadrilateral-pyramidal-shaped optical projections 60 are respectively substituted for the projections 36, 38 and 40 for defining the reference points $P_1$, $P_2$ and $P_3$ of the standard scale.

In the eighth embodiment, each of the optical projections 60 comprises two isosceles-triangular light-guide plate elements 62 and 64 having each a thickness of about 2 mm. Each of the light-guide plate elements 62 and 64 has the same optical structure as the light-guide plate 42 of the fourth embodiment (FIGS. 10 and 11). Namely, each of the light-guide plate elements 62 and 64 is constituted from a core layer containing fluorescent substances uniformly distributed therein, a first clad layer formed over an upper surface of the core layer, and a second clad layer formed over a lower surface of the core layer. The core layer is made of an acrylic resin material, and the first and second clad layers are made of an acrylic resin material exhibiting an index of refraction smaller than that of the acrylic resin material of the core layer.

The optical projection 60 is assembled from the two light-guide plate elements 62 and 64 into the generally-quadrilateral-pyramidal-shape, as shown FIGS. 17 and 18. To this end, as shown in FIG. 19, the light-guide plate element 62 has an upper half slit 62A formed therein and extended from the apex thereof to the middle position of the height thereof, and the light-guide plate element 64 has a lower half slit 64A, formed therein and extended from the center of the bottom side thereof to the middle position of the height thereof. Thus, the generally-quadrilateral-pyramidal-shaped projection 60 is obtained from the light-guide plate elements 62 and 64 by crosswisely interlinking them via the upper and lower half slits 62A and 64A. Note, a width of each of the slit 62A and 64A is approximately 2 mm, which is equal to the thickness of the light-guide plate elements 62 and 64.

As shown in FIGS. 17 and 18, an apex of the light-guide plate element 64 is shaped as a small square area 65, which defines one of the reference points $P_1$, $P_2$ and $P_3$ of the standard scale 10.

A part of the fluorescent radiation, generated and trapped in the core layer of each light-guide plate element (62, 64), is predominantly emitted from the slanting side faces (62B, 64B) thereof, but the fluorescent radiation cannot be substantially emitted from the triangular surfaces 62C, 64C thereof. Thus, the slanting side faces 62B and 64B of the light-guide plate elements 62 and 64 are conspicuously recorded on a photographed picture, whereby the apex or small square area 65 of each optical projection 60 can be easily located from the photographed picture.

Figure 20:
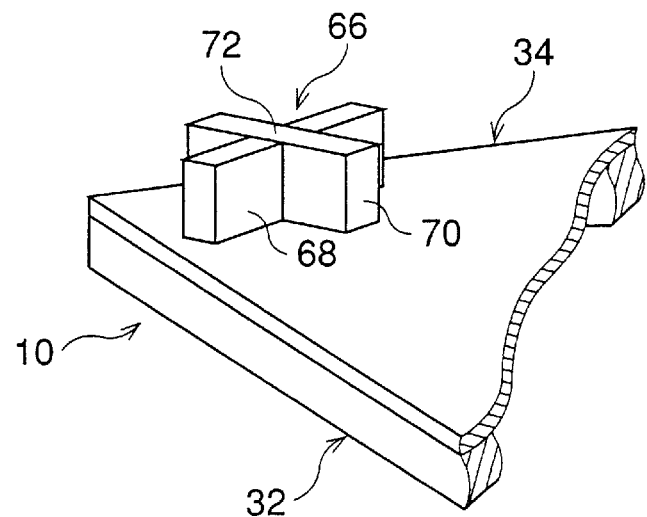
FIG. 20 is a partial perspective view of a ninth embodiment of the standard scale, according to the present invention.
Figure 21:
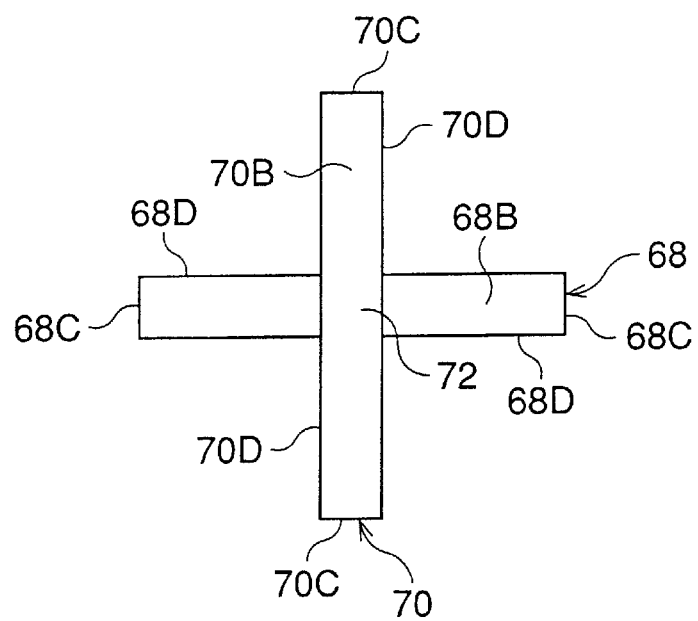
FIG. 21 is a plan view of a cross-shaped optical projection, shown in FIG. 20.
Figure 22:
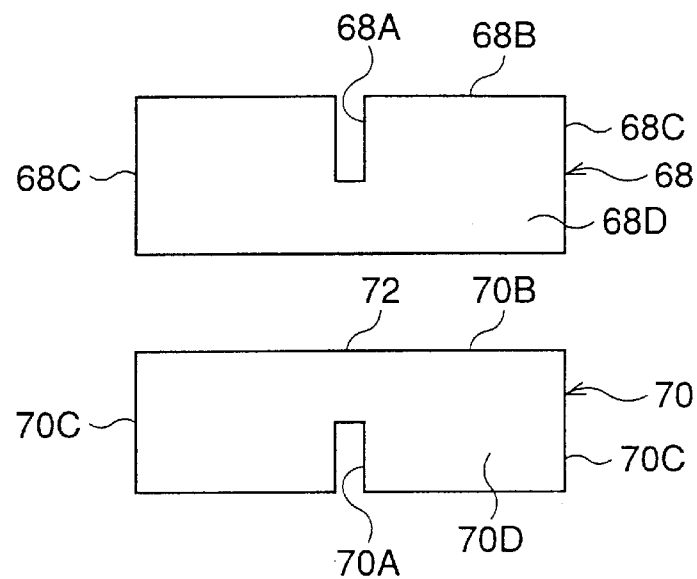
FIG. 22 is an elevational view of two parallelepiped-shaped light-guide plate elements for assembling the cross-shaped optical projection, shown in FIG. 20.

FIGS. 20, 21 and 22 show a ninth embodiment of the standard measurement scale 10, according to the present invention. Note, in FIG. 20, only an apex area of the standard measurement plate 10 is illustrated. This ninth embodiment also is substantially similar to the third embodiment (FIG. 9), except that three cross-shaped optical projections 66 are respectively substituted for the projections 36, 38 and 40 for defining the reference points $P_1$, $P_2$ and $P_3$ of the standard measurement scale 10.

In the ninth embodiment, each of the cross-shaped optical projections 66 comprises two parallelepiped-shaped light-guide plate elements 68 and 70 having each a suitable thickness. Each of the light-guide plate elements 68 and 70 has the same optical structure as the light-guide plate 42 of the fourth embodiment (FIGS. 10 and 11). Namely, each of the light-guide plate elements 68 and 70 is constituted from a core layer containing fluorescent substances uniformly distributed therein, a first clad layer formed over an upper surface of the core layer, and a second clad layer formed over a lower surface of the core layer. The core layer is made of an acrylic resin material, and the first and second clad layers are made of an acrylic resin material exhibiting an index of refraction smaller than that of the acrylic resin material of the core layer.

The optical projection 66 is assembled from the two light-guide plate elements 68 and 70 into the cross-shape, as shown FIGS. 20 and 21. To this end, as shown in FIG. 22, the light-guide plate element 68 has an upper half slit 68A, formed therein and extended from the center of the top side thereof to the middle position of the width thereof, and the light-guide plate element 70 has a lower half slit 70A, formed therein and extended from the center of the bottom side thereof to the middle position of the-width thereof. Thus, the cross-shaped projection 66 is obtained from the light-guide plate elements 68 and 70 by crosswisely interlinking them via the upper and lower half slits 68A and 70A. Note, a thickness of each slit 6&A, 70A is equal to each other. Note, a width of each of the slit 68A and 70A is equal to the thickness of the light-guide plate elements 68 and 70.

As shown in FIGS. 20 and 21, a central area 72 of the light-guide plate element 70 defines one of the reference points $P_1$, $P_2$ and $P_3$ of the standard measurement scale 10.

A part of the fluorescent radiation, generated and trapped in the light-guide plate elements 68 and 70, can be predominately emitted from only the top side face 68B and 70B and end side faces 68C and 70C thereof, but the fluorescent radiation cannot be substantially emitted from the side wall surfaces 68D and 70D thereof. Thus, the top side faces 68B and 70B and the end side faces 68C and 70C of the light-guide plate elements 68 and 70 are conspicuously recorded on a photographed picture, and the central area 72 of the light-guide plate element 70 can be easily located from the photographed picture.

In the ninth embodiment, preferably, the two light-guide plate elements 68 and 70 are identical to each other. Namely, only one kind of light-guide plate elements (68, 70) is produced, and the cross-shaped optical projection 66 is obtained from two light-guide plate elements by interlinking them crosswise via the slits thereof. Accordingly, the cross-shaped optical projection 66 can be obtained at a low cost.

Figure 23:
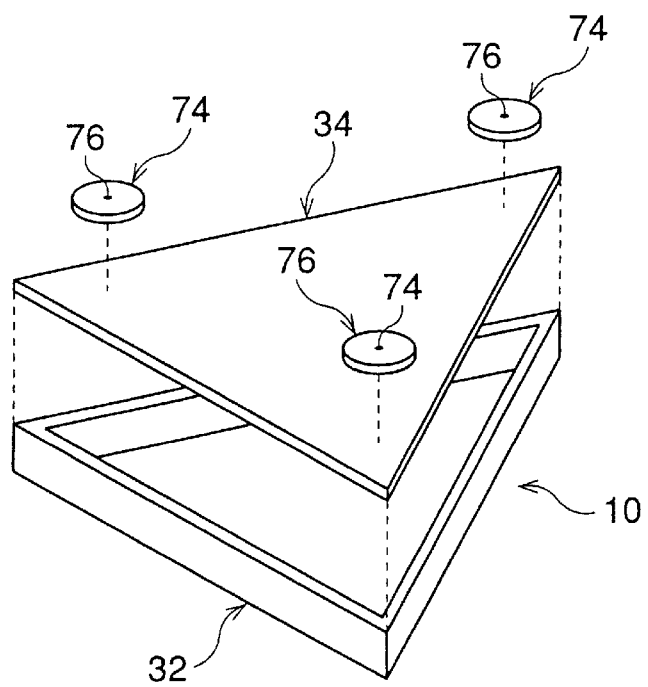
FIG. 23 is a perspective view of a tenth embodiment of the standard scale, according to the present invention.
Figure 24:
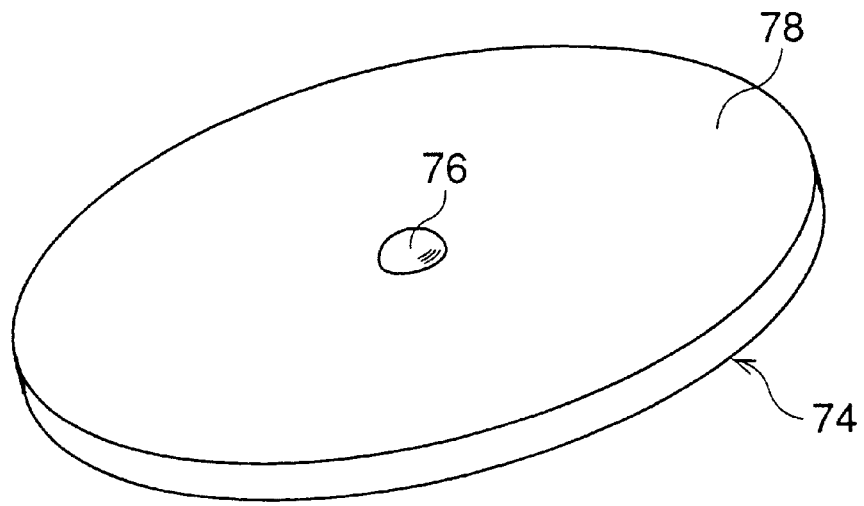
FIG. 24 is an enlarged perspective view showing a circular-shaped light-guide plate element, shown in FIG. 23.

FIGS. 23 and 24 show a tenth embodiment of the standard measurement scale 10, according to the present invention. This tenth embodiment also is substantially similar to the third embodiment (FIG. 9), except that three circular-shaped light-guide plate elements 74 are respectively substituted for the projections 36, 38 and 40 for defining the reference points $P_1$, $P_2$ and $P_3$ of the standard measurement scale 10.

In the tenth embodiment, each of the circular-shaped light-guide plate elements 74 has the same optical structure as the light-guide plate 42 of the fourth embodiment (FIGS. 10 and 11). Namely, each of the light-guide plate elements 74 is constituted from a core layer containing fluorescent substances uniformly distributed therein, a first clad layer formed over an upper surface of the core layer, and a second clad layer formed over a lower surface of the core layer. The core layer is made of an acrylic resin material, and the first and second clad layers are made of an acrylic resin material exhibiting an index of refraction smaller than that of the acrylic resin material of the core layer. Note, for example, the light-guide plate element 74 has a diameter of about 100 mm and a thickness of abut 50 mm.

As best shown in FIG. 24, each of the light-guide plate elements 74 has a hemispherical projection 76 attached to and placed at the center thereof, and the three projections 76 define the reference points $P_1$, $P_2$ and $P_3$ of the standard measurement scale 10.

Each of the projections 76 may be formed of a suitable transparent resin material, having an index of refraction different from that of the clad layers of the light-guide plate element 74 or that of air, so that a part of the fluorescent radiation, generated and trapped in the core layer of the light-guide plate element 74, is emitted from the projection 76. Of course, another part of the fluorescent radiation can be emitted from the peripheral side face of the light-guide plate element 74, but the fluorescent radiation cannot be emitted from the circular surface 78 (FIG. 24) of the plate element 74. Accordingly, the three hemispherical projections 76 of the plate elements 74 defining the reference points $P_1$, $P_2$ and $P_3$ of the standard measurement scale 10, are conspicuously recorded on a photographed picture.

Preferably, the hemispherical projection 76 is formed of a transparent plastic material exhibiting softness, so that the hemispherical projection 76 can be detachably adhered to the center of the light-guide plate element 74, due to the softness of the projection 76.

Figure 25:
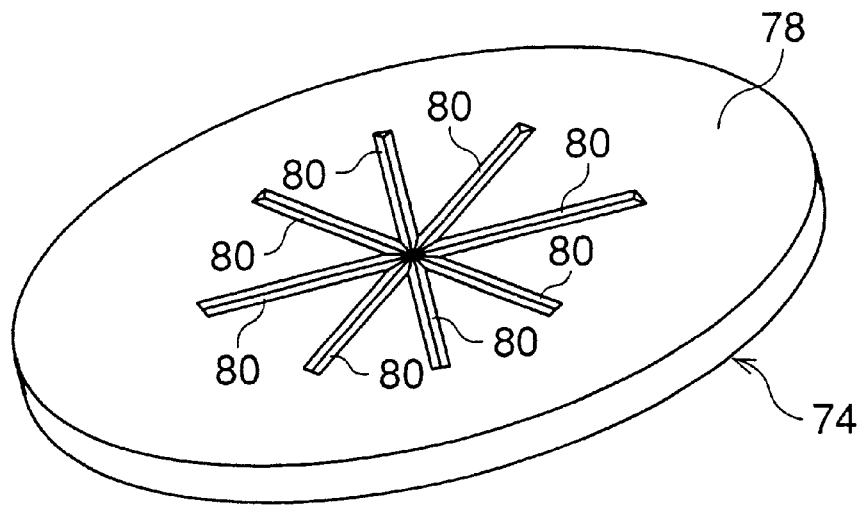
FIG. 25 is an enlarged perspective view, similar to FIG. 24, showing a modification of the circular-shaped light-guide plate element.

FIG. 25 shows a modification of the circular-shaped light-guide plate element 74. In this modification, eight V-shaped grooves 80 are formed in the light-guide plate element 74, so as to radially extend from the center thereof. Each of the V-shaped grooves 80 has a width of about 2 mm, and penetrates the core layer of the light-guide plate element 74, so that a part of the fluorescent radiation is predominantly emitted from the grooves 80. Of course, the convergent center of the grooves 80 defines one of the reference points $P_1$, $P_2$ and $P_3$ of the standard measurement scale 10.

Figure 26:
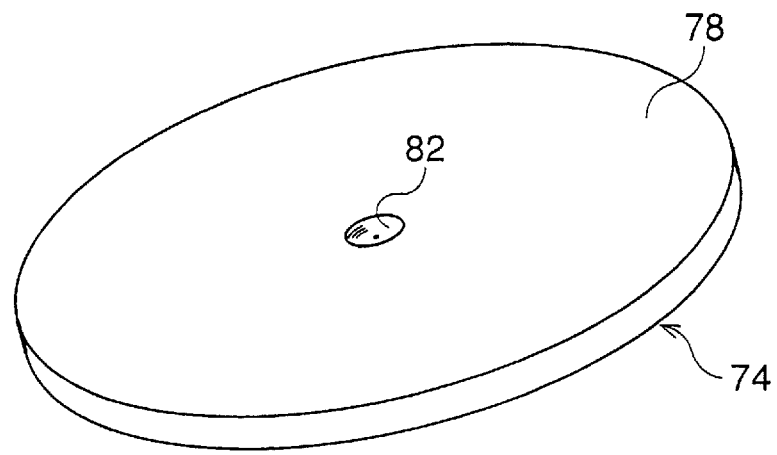
FIG. 26 is an enlarged perspective view, similar to FIG. 24, showing another modification of the circular-shaped light-guide plate element.

FIG. 26 shows another modification of the circular-shaped light-guide plate element 74. In this modification, a cone-shaped recess 82 is formed in the light-guide plate element 74, at the center thereof, and the cone-shaped recess 82 has a diameter of about 6 mm and a depth of about 3 mm, penetrating the core layer of the light-guide plate element 74, so that a part of the fluorescent radiation can be emitted from the cone-shaped recess 82. Of course, the center of the recess 82 defines one of the reference points $P_1$, $P_2$ and $P_3$ of the standard measurement scale 10.

Figure 27:
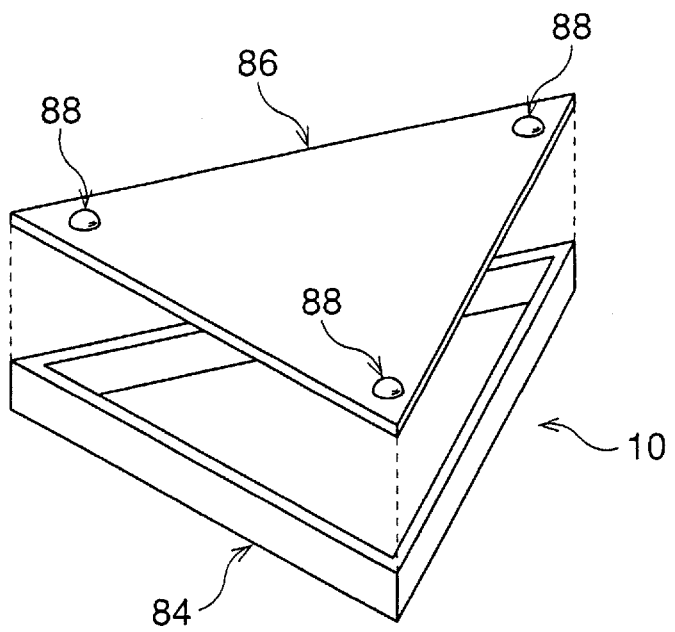
FIG. 27 is a perspective view of an eleventh embodiment of the standard scale, according to the present invention.

FIG. 27 shows an eleventh embodiment of the standard measurement scale 10, according to the present invention. In this eleventh embodiment, the standard measurement scale 10 comprises an equilateral-triangular frame 84, and an equilateral-triangular light-guide plate 86, securely attached to the frame 84. The triangular frame 84 may be assembled in the same manner as the triangular frame 32 of the third embodiment (FIG. 9). The equilateral-triangular light-guide plate 86 has the same optical structure as the light-guide plate 42 of the fourth embodiment (FIGS. 10 and 11). Namely, the light-guide plate 86 is constituted from a core layer containing fluorescent substances uniformly distributed therein, a first clad layer formed over an upper surface of the core layer, and a second clad layer formed over a lower surface of the core layer. The core layer is made of an acrylic resin material, and the first and second clad layers are made of an acrylic resin material exhibiting an index of refraction smaller than that of the acrylic resin material of the core layer.

As shown in FIG. 27, three small hemispherical projections 88 are respectively attached to the apex areas of the upper surface of the light-guide plate 86, which define the reference points $P_1$, $P_2$ and $P_3$ of the standard measurement scale 10, where a distance between the points $P_1$, $P_2$ and $P_3$ may be 1 m.

Similar to the projection 76 of the tenth embodiment (FIG. 24), the projection 88 may be formed of a suitable transparent resin material, having an index of refraction different from that of the clad layers of the light-guide plate 86, so that a part of the fluorescent radiation, generated and trapped by the light-guide plate 86, is predominantly emitted from the projections 88. Of course, another part of the fluorescent radiation can be emitted from the peripheral side faces of the light-guide plate 86, but the fluorescent radiation cannot be substantially emitted from the upper and lower surfaces of the light-guide plate 86. Accordingly, the three hemispherical projections 88 of the light-guide plate 86, defining the reference points $P_1$, $P_2$ and $P_3$ of the standard measurement scale 10, are conspicuously recorded on a photographed picture.

In the eleventh embodiment, each of the hemispherical projections 88 may be formed of a transparent soft plastic material exhibiting softness, so that each projection 88 can be detachably adhered to the light-guide plate 86, due to the softness of the projection 88.

Figure 28:
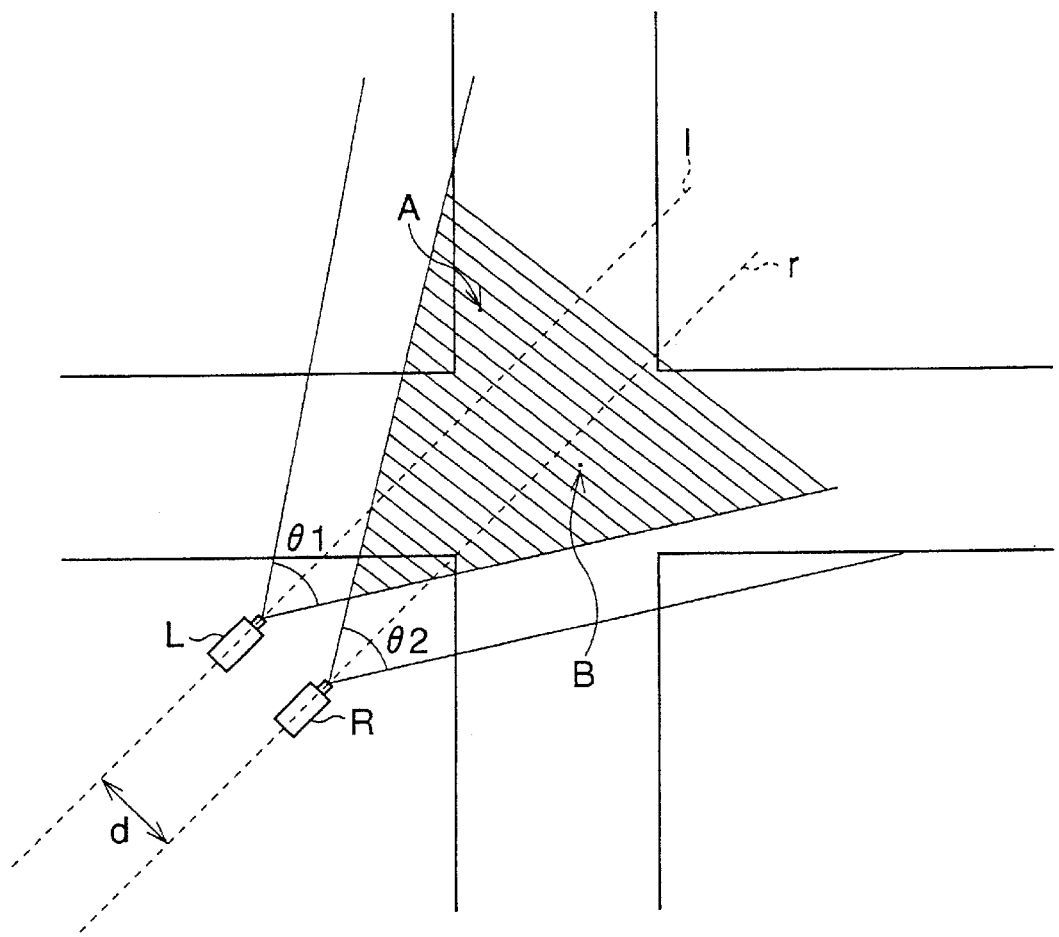
FIG. 28 is a conceptual plan view showing a stereo-photogrammetric measurement system using markers for defining a standard measurement scale, according to the present invention.

FIG. 28 conceptually shows a stereo-photogrammetric measurement system, using markers for defining a standard measurement scale, constructed according to the present invention. In this drawing, an intersection point, at which a traffic accident has occurred, is illustrated. Two cameras "L" and "R" are positioned at a suitable location, so as to be spaced apart from each other by a predetermined distance of d. Two respective broken lines, indicated by references "l" and "r", are optical axes of the cameras "L" and "R". The camera "L" has an angle of view indicated by reference $\theta_1$, and the camera "R" has an angle of view indicated by reference $\theta_2$.

As shown in FIG. 28, a photographing area of the camera "L" is defined by the view angle of $\theta_1$, and a photographing area of the camera "R" is defined by the view angle of $\theta_2$. The photographing areas of the camera "L" and "R" overlap with each other, as shown by a hatched area in FIG. 28. This hatched area or overlapped area is used in the stereo-photogrammetric measurement. Then, the standard-scale-defining markers must be positioned within the overlapped area. Namely, as shown in FIG. 28, for example, the standard-scale-defining markers are positioned at locations A and B, and a distance between the markers, at the locations A and B, is meausured.

Figure 29:
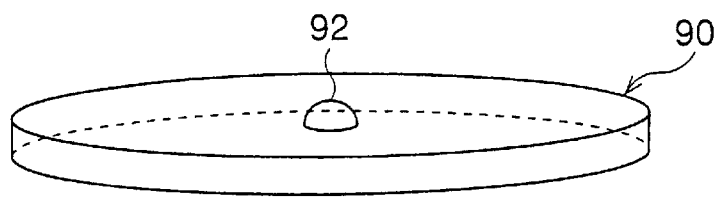
FIG. 29 is a perspective view of a first embodiment of the standard-scale-defining marker, according to the present invention.
Figure 30:
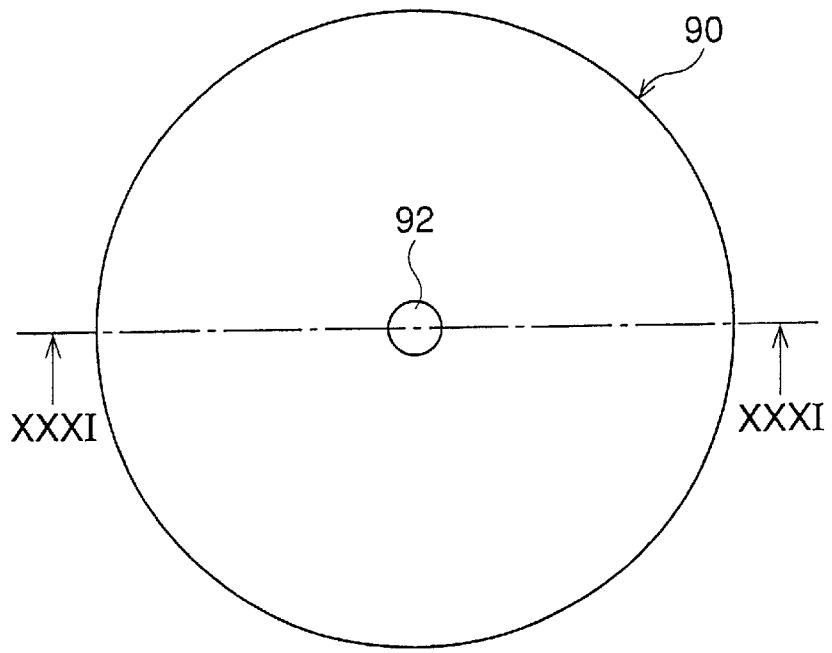
FIG. 30 is a plan view of the standard-scale-defining marker of FIG. 29.
Figure 31:
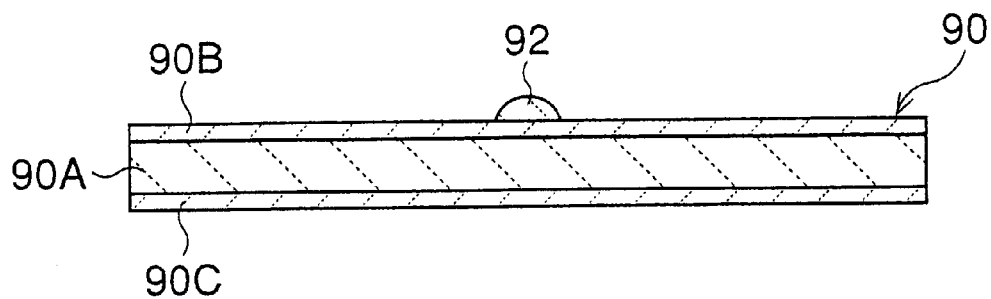
FIG. 31 is a sectional view taken along line XXXI—XXXI of FIG. 30.

FIGS. 29, 30 and 31 show a first embodiment of the marker for defining a standard measurement scale, according to the present invention. The marker comprises a circular-shaped light-guide plate 90 having a diameter of about 100 mm, and a hemispherical projection 92 placed at the center of the light-guide plate 90. In the stereo-photogrammetric measurement, as shown in FIG. 28, the two markers are prepared, and are positioned at the locations A and B, respectively, such that the hemispherical projection 92 of each marker coincides with an indication marked at the location (A, B). Namely, the hemispherical projection 92 of the marker serves as a reference point for defining the standard measurement scale.

As shown in FIG. 31, the light-guide plate 90 is constituted from a core layer 90A containing fluorescent substances uniformly distributed therein, a first clad layer 90B formed over an upper surface of the core layer 90A, and a second clad layer 90C formed over a lower surface of the core layer 90A. In this embodiment, the core layer 90A is made of an acrylic resin material, and the first and second clad layers 90B and 90C are made of an acrylic resin material exhibiting an index of refraction smaller than that of the acrylic resin material of the core layer 90A. Namely, the light-guide plate 90 has the same optical structure as the light-guide plate 42 shown in FIGS. 10 and 11.

On the other hand, the hemispherical projection 92 may be formed of a suitable transparent resin material, having an index of refraction different from that of the clad layers 90B and 90C of the light-guide plate 90 or that of air, so that a part of the fluorescent radiation, generated and trapped in the core layer 90A is predominantly emitted from the projection 92. Note, another part of the fluorescent radiation can be emitted from the peripheral side face of the light-guide plate 90, but the fluorescent radiation cannot be substantially emitted from the first and second clad layers 90B and 90C of the light-guide plate 90. Accordingly, the hemispherical projection 92 of the marker is conspicuously recorded on a photographed picture. Namely, the designation of the hemispherical projection or reference point 92 of the marker, with a cursor on a TV monitor, can be easily carried out.

Further, the marker comprising the light-guide plate 90 can be easily positioned, such that the reference point 92 thereof exactly coincides with the indication marked at the location (A, B) due to the flatness of the marker or light-guide plate 90 and the transparency of the marker per se.

In the first embodiment of the maker according to the present invention, the hemispherical projection 92 may be formed of a transparent plastic material exhibiting softness, so that the projections 92 can be detachably adhered to the light-guide plate 90, due to the softness of the projection. 92.

Figure 32:
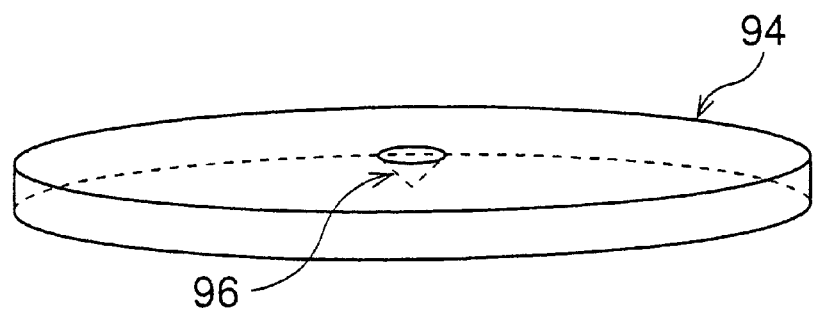
FIG. 32 is a perspective view of a second embodiment of the standard-scale-defining marker, according to the present invention.
Figure 33:
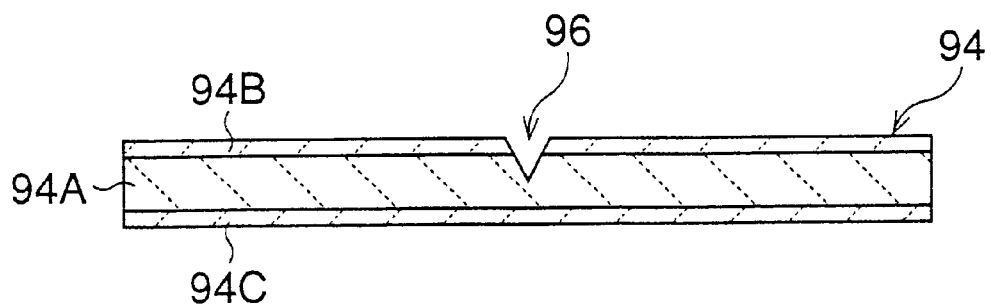
FIG. 33 is a diametrically-sectional view of the standard-scale-defining marker, shown in FIG. 32.

FIGS. 32 and 33 show a second embodiment of the marker for defining a standard measurement scale, according to the present invention. This marker also comprises a circular-shaped light-guide plate 94 having the same optical structure of the light-guide plate 90 of the first embodiment (FIGS. 29, 30 and 31). Namely, as shown in FIG. 33, the light-guide plate 94 is constituted from a core layer 94A containing fluorescent substances uniformly distributed therein, a first clad layer 94B, formed over an upper surface of the core layer 94A, and a second clad layer 94C, formed over a lower surface of the core layer 94A.

In the second embodiment, the marker features a cone-shaped recess 96, formed at the center of the upper surface of the light-guide plate 94. As best shown in FIG. 33, the cone-shaped recess 96 penetrates the core layer 94A, so that a part of the fluorescent radiation is emitted from the cone-shaped recess 96. of course, the cone-shaped recess 96 of the marker serves as a reference point for defining the standard measurement scale.

Similar to the first embodiment of the marker (FIGS. 29, 30 and 31), the cone-shaped recess 96 of the marker is conspicuously recorded on a photographed picture due to the emission of fluorescent radiation therefrom. Also, the marker comprising the light-guide plate 94 can be easily positioned, such that the reference point 96 thereof exactly coincides with the indication marked at the location (A, B), due to the flatness of the marker or light-guide plate 94 and the transparency of the marker per se.

Figure 34:
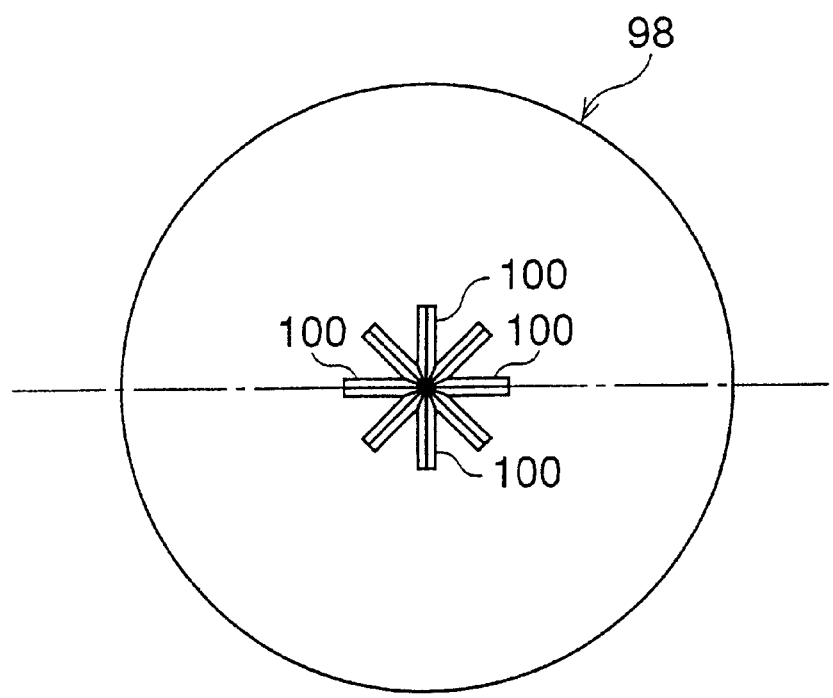
FIG. 34 is a plan view of a third embodiment of the standard-scale-defining marker, according to the present invention.
Figure 35:
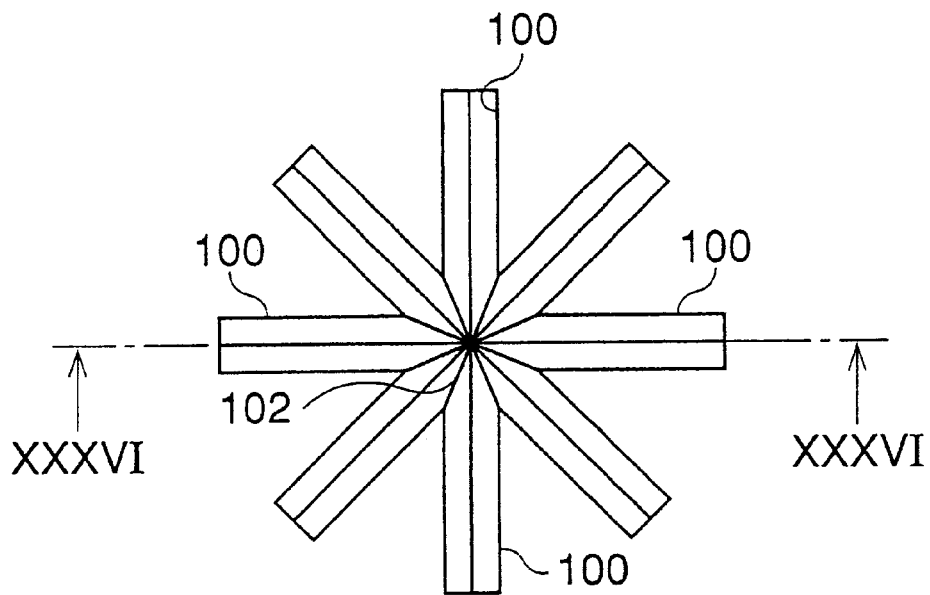
FIG. 35 is an enlarged view of eight V-shaped troughs formed in the standard-scale-defining marker, shown in FIG. 34.
Figure 36:
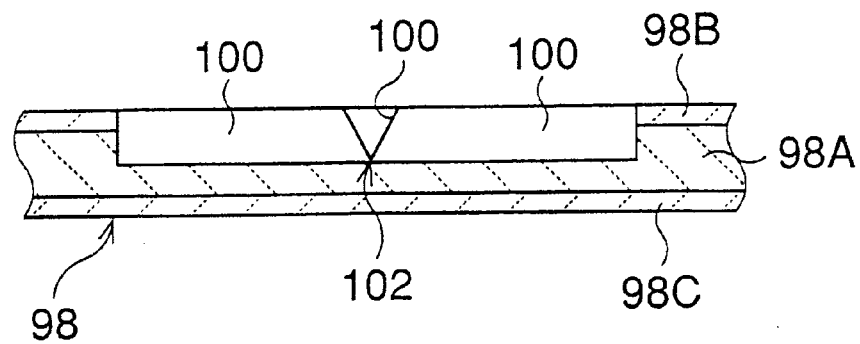
FIG. 36 is a sectional view taken along line XXXVI—XXXVI of FIG. 35.

FIGS. 34, 35 and 36 show a third embodiment of the marker for defining a standard measurement scale, according to the present invention. This marker also comprises a circular-shaped light-guide plate 98, having the same optical structure as the light-guide plate 90 of the first embodiment (FIGS. 29, 30 and 31). Namely, as shown in FIG. 36, the light-guide plate 98 is constituted from a core layer 98A containing fluorescent substances uniformly distributed therein, a first clad layer 98B, formed over an upper surface of the core layer 98A, and a second clad layer 98C, formed over a lower surface of the core layer 98A.

In the third embodiment, as best shown in FIG. 35, the marker features eight V-shaped grooves 100, formed in an upper surface of the light-guide plate 98, radially extending from the center 102 thereof. Each of the V-shaped grooves 100 penetrates in the core layer 98A of the light-guide plate 96, as shown in FIG. 36, so that a part of the fluorescent radiation is predominantly emitted from the V-shaped grooves 100. The convergent center 102 of the eight V-shaped grooves 100 serves as a reference point for defining the standard measurement scale.

Similar to the first and second embodiments of the marker (FIGS. 29, 30 and 31; and FIGS. 32 and 34), the V-shaped grooves 100 of the marker are conspicuously recorded on a photographed picture due to the emission of fluorescent radiation therefrom. Also, the marker comprising the light-guide plate 100 can be easily positioned, such that the center or reference point 102 thereof exactly coincides with the indication marked at the location (A, B) due to the flatness of the marker or light-guide plate 98 and the transparency of the marker per se.

Figure 37:
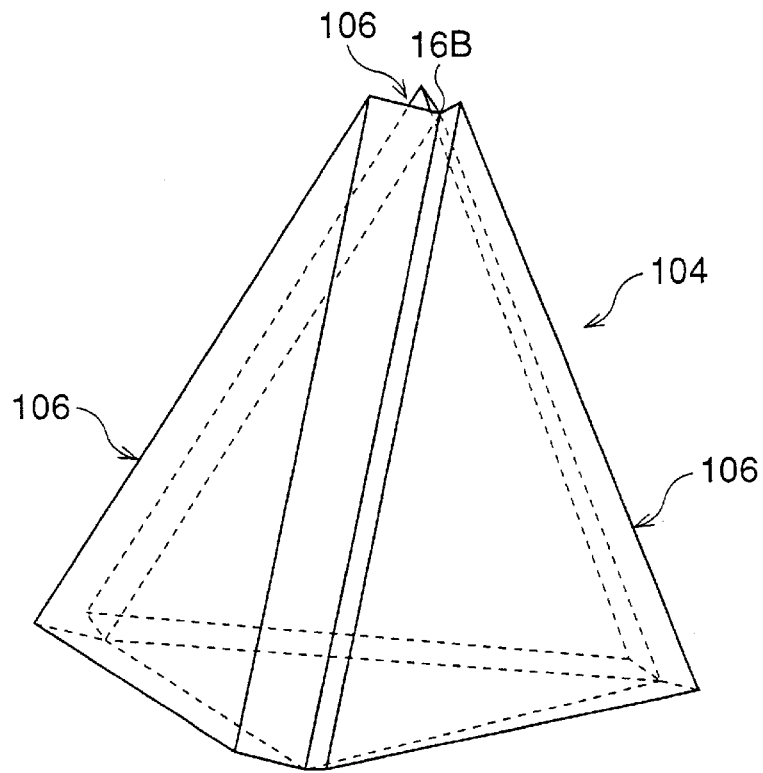
FIG. 37 is a perspective view of a fourth embodiment of the standard-scale-defining marker, according to the present invention.
Figure 38:
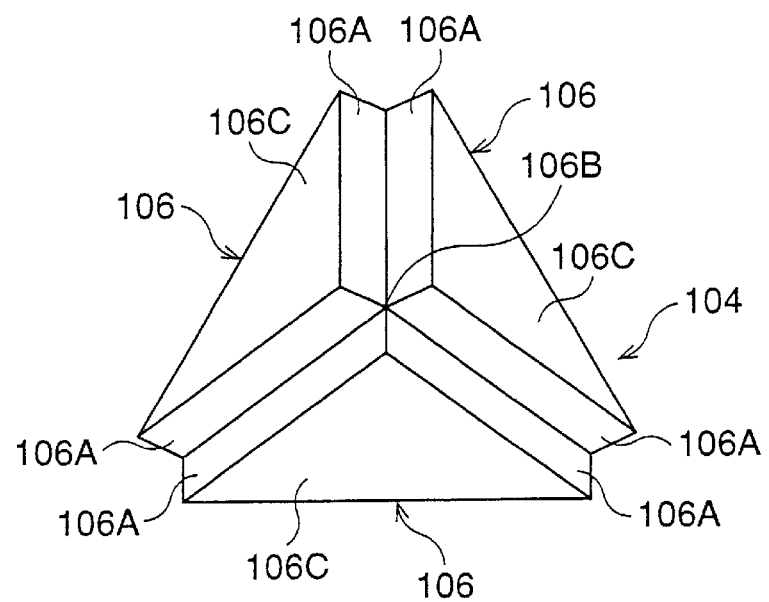
FIG. 38 is a plan view of the standard-scale-defining marker, shown in FIG. 37.

FIGS. 37 and 38 show a fourth embodiment of the marker for defining a standard measurement scale, according to the present invention. This marker comprises a generally-triangular-pyramidal-shaped optical assembly 104, constructed from three isosceles-triangular light-guide plate elements 106, a bottom side of which may have a length of about 100 mm. Each of the light-guide plate elements 106 has the same optical structure as the light-guide plate 90 of the first embodiment (FIGS. 29, 30, and 31). Namely, each of the light-guide plate elements 106 is constituted from a core layer containing fluorescent substances uniformly distributed therein, a first clad layer formed over an upper surface of the core layer, and a second clad layer formed over a lower surface of the core layer.

The generally-triangular-pyramidal-shaped optical assembly 104 is assembled from the three light-guide plate elements 106 in such a manner that an inner triangular-pyramid space is defined therewithin. As best shown in FIG. 38, two contiguous slanting side faces 106A of two adjacent light-guide plate elements 106 form a V-shaped trough extending along a corresponding ridgeline of the inner triangular-pyramid space, and an apex 106B of the inner triangular-pyramidal space serves as a reference point for defining a standard measurement scale.

The fluorescent radiation, generated and trapped in the core layer of each light-guide plate element 106, cannot be substantially emitted from a triangular surface 106C thereof, but a part of the fluorescent radiation can be emitted from the side faces 106B thereof. Thus, the V-shaped troughs of the optical assembly 104 are conspicuously recorded on a photographed picture, due to the predominant emission of fluorescent radiation therefrom, whereby the center 106B of the V-shaped troughs can be easily located from the photographed picture. Also, the marker comprising the optical assembly 104 can be easily positioned, such that the apex or reference point 106B thereof exactly coincides with the indication marked at the location (A, B) due to the transparency of the marker per se.

Figure 39:
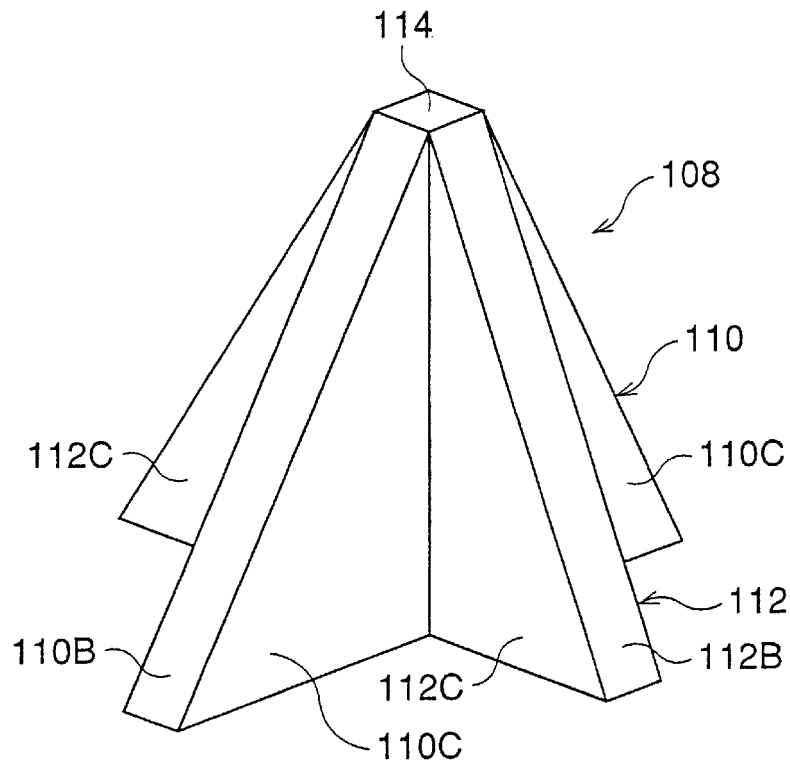
FIG. 39 is a perspective view of a fifth embodiment of the standard-scale-defining marker, according to the present invention.
Figure 40:
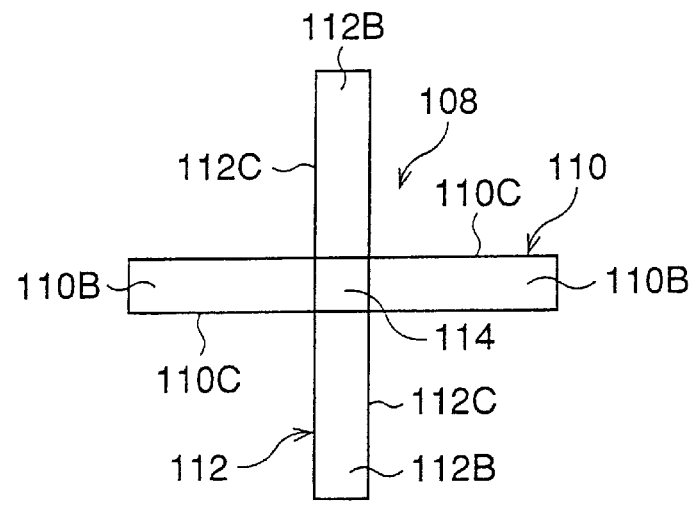
FIG. 40 is a plan view of the standard-scale-defining marker, shown in FIG. 39.
Figure 41:
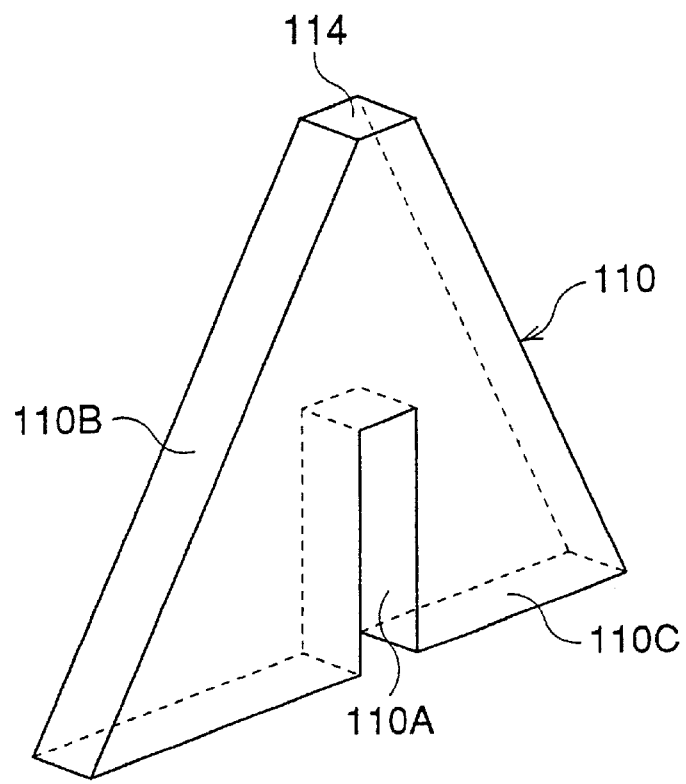
FIG. 41 is a perspective view of two isosceles-triangular light-guide plate elements for assembling the standard-scale-defining marker, shown in FIGS. 39 and 40.
Figure 41:
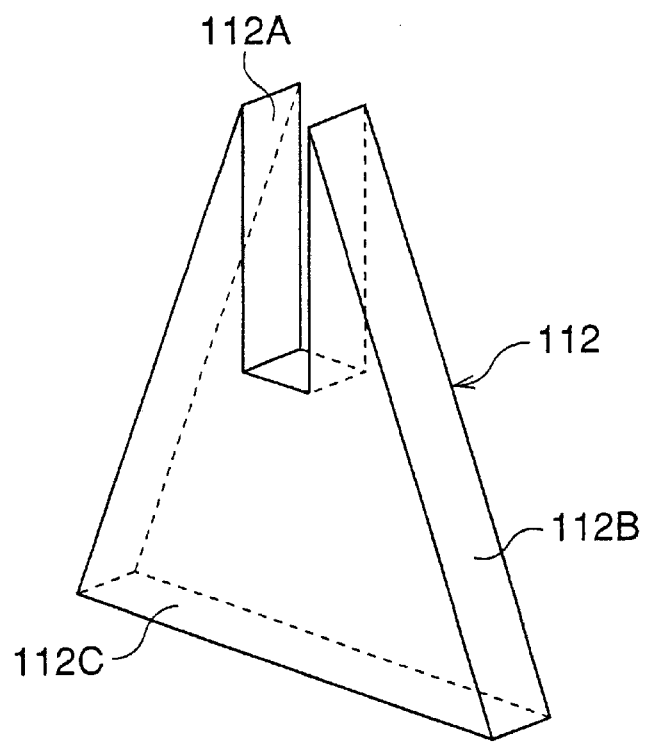

FIGS. 39, 40, and 41 show a fifth embodiment of the marker for defining a standard measurement scale, according to the present invention. This marker comprises a generally-quadrilateral-pyramidal-shaped optical assembly 108 constructed from two isosceles-triangular light-guide plate elements 110 and 112, a bottom side of which may have a length of about 100 mm. Each of the light-guide plate elements 110 and 112 has the same optical structure as the light-guide plate 90 of the first embodiment (FIGS. 29, 30, and 31). Namely, each of the light-guide plate elements 110 and 112 is constituted from a core layer containing fluorescent substances uniformly distributed therein, a first clad layer formed over an upper surface of the core layer, and a second clad layer formed over a lower surface of the core layer.

The optical assembly 108 is assembled from the two light-guide plate elements 110 and 112 into the generally-quadrilateral-pyramidal-shape as shown FIGS. 39 and 40. To this end, as shown in FIG. 41, the light-guide plate element 110 has a lower half slit 110A, formed therein and extended from the center of the bottom side thereof to the middle position of the height thereof, and the light-guide plate element 112 has an upper half slit 112A, formed therein and extended from the apex thereof to the middle position of the height thereof. Thus, the generally-quadrilateral-pyramidal-shaped optical assembly 108 is obtained from the light-guide plate elements 110 and 112 by crosswisely interlinking them via the lower and upper half slits 110A and 112A. Note, of course, a width of each slit 110A and 112A is equal to the thickness of the light-guide plate element 110, 112.

As is apparent from FIGS. 39, 40 and 41, an apex of the light-guide plate element 110 is shaped as a small square area 114, which serves as a reference point for defining a standard measurement scale.

A part of the fluorescent radiation, generated and trapped in the core layer of each light-guide plate element (110, 112), are predominantly emitted from both slanting side faces (110B, 112B) thereof, but the fluorescent radiation cannot be substantially emitted from both triangular surfaces (110C, 112C) thereof. Thus, the slanting side faces 110B and 110B of the light-guide plate elements 110 and 112 are conspicuously recorded on a photographed picture, whereby the apex or small squar area 114 of the optical assembly 108 can be easily located from the photographed picture. Also, the marker comprising the optical assembly 108 can be easily positioned, such that the apex or reference point 114 thereof exactly coincides with the indication marked at the location (A, B) due to the transparency of the marker per se.

In the fifth embodiment of the marker shown in FIGS. 39, 40 and 41, it is preferable to detachably and crosswisely interlink the light-guide plate elements 110 and 112, because the disassembled light-guide plate elements 110 and 112 can be compactly stored, and can be carried without bulkiness.

Finally, it will be understood by those skilled in the art that the foregoing description is of preferred embodiments of the device and assembly, and that various changes and modifications may be made to the present invention without departing from the spirit and scope thereof.

The present disclosure relates to subject matter contained in Japanese Patent Applications No. 8-310029 (filed on Nov. 6, 1996), No. 8-310030 (filed on Nov. 6, 1996), and No. 9-276546 (filed on Sep. 24, 1997) which are expressly incorporated herein, by reference, in their entireties.

What is claimed is:

1. A standard measurement scale used in a photogrammetric measurement system, comprising:

a frame member; and at least three reference-point-forming elements, each reference-point-forming element having a reference point designated therein, and said at least three reference-point-forming elements being arranged on said frame member to define a reference plane including said reference points, each reference-point-forming element comprising a circular-shaped plate element, a center of each circular-shaped plate element defining the reference point of a corresponding one of said reference-point-forming elements, and each circular-shaped plate element comprising a light-guide plate element including a core layer containing fluorescent substances, said light-guide plate element having a hemispherical projection attached to the center thereof for emitting fluorescent radiation therefrom.

2. A standard measurement scale used in a photogrammetric measurement system, comprising:

a frame member;

a plate member mounted on said frame member;

at least three reference-point-forming elements, each reference-point-forming element having a reference point designated therein, and said at least three reference-point-forming elements being arranged on said plate member to define a reference plane including said reference points, each of said reference-point-forming elements being formed as a circular-shaped plate element, a center of each circular-shaped plate element defining said designated reference point of said reference-point-forming element and each of said circular-shaped plate elements being formed as a light-guide plate element including a core layer containing fluorescent substances, said light-guide plate element having a hemispherical projection attached to the center thereof for emitting fluorescent radiation therefrom.

3. A standard measurement scale as set forth in claim 1, wherein said at least three reference-point-forming elements are equally spaced apart from each other by a predetermined distance.

4. A standard measurement scale as set forth in claim 1, wherein each of said reference-point-forming elements is formed as a projection for defining the reference point thereof.

5. A standard measurement scale as set forth in claim 4, wherein each hemispherical projection is formed as a light-emitting projection.

6. A marker used in a photogrammetric measurement system for defining a standard measurement scale, comprising a light-guide plate member including a core layer containing fluorescent substances and having a plurality of light emitting sots for defining reference points on said light-guide plate member, each light-emitting spot being defined as a hemispherical projection attached to said light-guide plate member for emitting fluorescent radiation therefrom.

* * * * *